US011703371B1

(12) United States Patent
Anderson et al.

(10) Patent No.: US 11,703,371 B1
(45) Date of Patent: Jul. 18, 2023

(54) BIN MATERIAL MEASUREMENT

(71) Applicant: DeviceSolutions, Morrisville, NC (US)

(72) Inventors: Keith William Anderson, Hillsborough, NC (US); Mark Adam Bednasz, Cary, NC (US); Wilson Christopher Lamb, Hillsborough, NC (US); Anthony James Sammarco, Raleigh, NC (US); Andrew Alden Spear, Raleigh, NC (US); Robert Charles Witter, Hillsborough, NC (US)

(73) Assignee: DEVICESOLUTIONS, Morrisville, NC (US)

( * ) Notice: Subject to any disclaimer, the term of this patent is extended or adjusted under 35 U.S.C. 154(b) by 178 days.

(21) Appl. No.: 17/219,235

(22) Filed: Mar. 31, 2021

Related U.S. Application Data

(60) Provisional application No. 63/005,630, filed on Apr. 6, 2020.

(51) Int. Cl.
*G01F 23/24* (2006.01)
*A01F 25/14* (2006.01)
*G01F 23/00* (2022.01)
*G01F 23/80* (2022.01)

(52) U.S. Cl.
CPC ............ *G01F 23/248* (2013.01); *A01F 25/14* (2013.01); *G01F 23/0007* (2013.01); *G01F 23/804* (2022.01)

(58) Field of Classification Search
None
See application file for complete search history.

(56) References Cited

U.S. PATENT DOCUMENTS

| 4,807,471 | A | 2/1989 | Cournane et al. |
| 8,161,813 | B2 | 4/2012 | Faist |
| 8,950,255 | B2 | 2/2015 | Chang et al. |
| 9,797,763 | B2 | 10/2017 | Chang et al. |
| 10,405,497 | B1 | 9/2019 | Casebolt et al. |
| 10,816,405 | B2 | 10/2020 | Dann |
| 2009/0325658 | A1* | 12/2009 | Phelan ................. G01F 13/005 460/6 |
| 2014/0172360 | A1* | 6/2014 | Folk ..................... G01F 23/247 702/156 |

* cited by examiner

*Primary Examiner* — Paul M. West
*Assistant Examiner* — Mark A Shabman
(74) *Attorney, Agent, or Firm* — Tarolli, Sundheim, Covell & Tummino LLP

(57) ABSTRACT

A bin volume predictor can receive data characterizing measurements of a temperature at a plurality of temperature sensors of a temperature sensor cable that is positioned to extend along a height of the storage bin in an interior of the storage bin and data characterizing measurements of an ambient temperature of an exterior of the storage bin. The bin volume predictor identifies, based on the measured temperature for temperature sensors in the interior of the storage bin, a topmost covered temperature sensor of the temperature sensor cable. Moreover, the bin volume predictor determines, based on the identified topmost covered temperature sensor, an amount of material stored in the storage bin.

17 Claims, 9 Drawing Sheets

BIN CONFIGURATION AND VARIABLE DEFINITION 300

Bin Configuration Variables:

- Number of Interior Temperature Sensors
- Lookup value to report when top temperature sensor is declared covered
    - Examples: pounds, tons, rings, kilograms
- Lookup values to report when interior temperature sensor declared uncovered
    - Examples: pounds, tons, rings, kilograms
- Spacing between interior temperature sensors
    - Example: 12 inches (30.48 cm), 24 inches (60.96 cm), 36 inches (91.44 cm)
- Auger Motor
    - Sensor enabled for this bin / set of bins (yes/no)
    - Number of tandem bins connected to auger motor control
    - Amount of material per minute of run time (configurable)
    - Continuous on time exceeded duration (configurable)
    - Continuous off time exceeded duration (configurable)

Sensor Reading Variables:

- Minimum number of measurements needed (example: 6)
- Measurement Time (example: 1:00)
- Time between measurements (example: 10 minutes to 1 hour)

Values Read:

- Ambient Temperature Sensor Reading
- Interior Temperature Sensors readings
- Auger motor:
    - Motor on (timestamp)
    - Motor off (timestamp)

Adjustable Comparators:

- Ambient temperature sensor stability variance constant
- Top interior temperature sensor variance constant
- Remaining interior temperature sensor variance constant

FIG. 3

BIN MATERIAL MEASUREMENT

CROSS-REFERENCE TO RELATED APPLICATION

This application claims the benefit of priority to U.S. Provisional Application No. 63/005,630, filed on 6 Apr. 2020 the entirety of which is herein incorporated by reference.

TECHNICAL FIELD

This disclosure relates to systems and methods that determine an amount of material in a storage bin.

BACKGROUND

A silo is a structure for storing bulk materials. Silos are used in agriculture to store grain (see grain elevators) or fermented feed known as silage. Silos are commonly used for bulk storage of feed, grain, coal, cement, carbon black, woodchips, food products and sawdust. Three types of silos are in widespread use today: tower silos, bunker silos and bag silos.

A bin, or storage bin refers to another storage structure for storing bulk materials. Some bins are shorter than a silo. Moreover, a storage bin may be employed to hold dry matter such as cement or grain. As used herein the terms "silo" and "storage bin" refer to the same structure and can be used interchangeably.

In some examples, a storage bin may be implemented as a cylindrical structure, such as about 6 feet to about 12 feet (about 1.8 meters to about 3.6 meters) in diameter and about 8 feet to about 40 feet (about 2.4 meters to about 12.2 meters) in height with slipform and Jumpform concrete silos being the larger diameter and taller silos. A storage bin can be made of many materials. Wood staves, concrete staves, cast concrete, and steel panels have all been used, and have varying cost, durability, and airtightness tradeoffs. Storage bins storing grain, cement and woodchips are typically unloaded with air slides or augers. Storage bins can be unloaded into rail cars, trucks or conveyors.

Grain may be dried in a grain dryer before being stored in a storage bin. The storage bin may be round or square, but round bins tend to empty more easily due to a lack of corners for the stored material to become wedged and encrusted. The stored material may be powdered, as seed kernels, or as cob corn. Due to the dry nature of the stored material, it tends to be lighter than silage and can be more easily handled by under-floor grain unloaders. To facilitate drying after harvesting, some grain bins contain a hollow perforated or screened central shaft to permit easier air infiltration into the stored grain.

Animal feed is food given to domestic animals in the course of animal husbandry. There are two basic types: fodder and forage. As used herein the term "feed" refers to all types of animal feed, including fodder and forage. The animal feed can be stored in the aforementioned storage bins. There are a number of factors that impact feed consumption in a typical agricultural area (e.g., a farm) for any given storage bin. These factors include, but are not limited to the number of animals fed by the given storage bin, the time of year, local weather conditions, animal health, and a myriad of other unpredictable factors that make it difficult and/or impossible to accurately track the amount of feed within each storage bin at any one time.

SUMMARY

One example relates to a non-transitory machine readable medium having machine executable instructions. The machine executable instructions include a bin volume predictor that receives data characterizing measurements of a temperature at a plurality of temperature sensors of a temperature sensor cable that is positioned to extend along a height of the storage bin in an interior of the storage bin and data characterizing measurements of an ambient temperature of an exterior of the storage bin. The bin volume predictor also identifies, based on the measured temperature for temperature sensors in the interior of the storage bin, a topmost covered temperature sensor of the temperature sensor cable. The bin volume predictor further determines, based on the identified topmost covered temperature sensor, an amount of material stored in the storage bin.

Another example relates to a system that includes a non-transitory memory having machine executable instructions and a processing unit for accessing the memory and executing the machine executable instructions. The machine executable instructions can include a bin volume predictor that receives data characterizing measurements of a temperature at a plurality of temperature sensors of a temperature sensor cable that is positioned to extend along a height of the storage bin in an interior of the storage bin and data characterizing measurements of an ambient temperature of an exterior of the storage bin. The bin volume predictor also identifies, based on the measured temperature for temperature sensors in the interior of the storage bin, a topmost covered temperature sensor of the temperature sensor cable. The bin volume predictor determines, based on the identified topmost covered temperature sensor an amount of material stored in the storage bin. Moreover, the bin volume predictor provides data to a user interface (UI) that outputs visual indicia characterizing the amount of material stored in the storage bin.

Yet another example relates to a method for determining an amount of material in a storage bin. The method including receiving, at a bin predictor executing on a computing platform, data characterizing measurements of a temperature at a plurality of temperature sensors of a temperature sensor cable that is positioned to extend along a height of the storage bin in an interior of the storage bin and data characterizing measurements of an ambient temperature of an exterior of the storage bin. The method can also include identifying, by the bin volume predictor, based on the measured temperature for temperature sensors in the interior of the storage bin, a topmost covered temperature sensor of the temperature sensor cable. The method can further include determining, by the bin volume predictor, based on the identified topmost covered temperature sensor an amount of material stored in the storage bin.

BRIEF DESCRIPTION OF THE DRAWINGS

FIG. 3 illustrates a list of variables employable to predict the amount of material in a storage bin.

DETAILED DESCRIPTION

Figure 1:
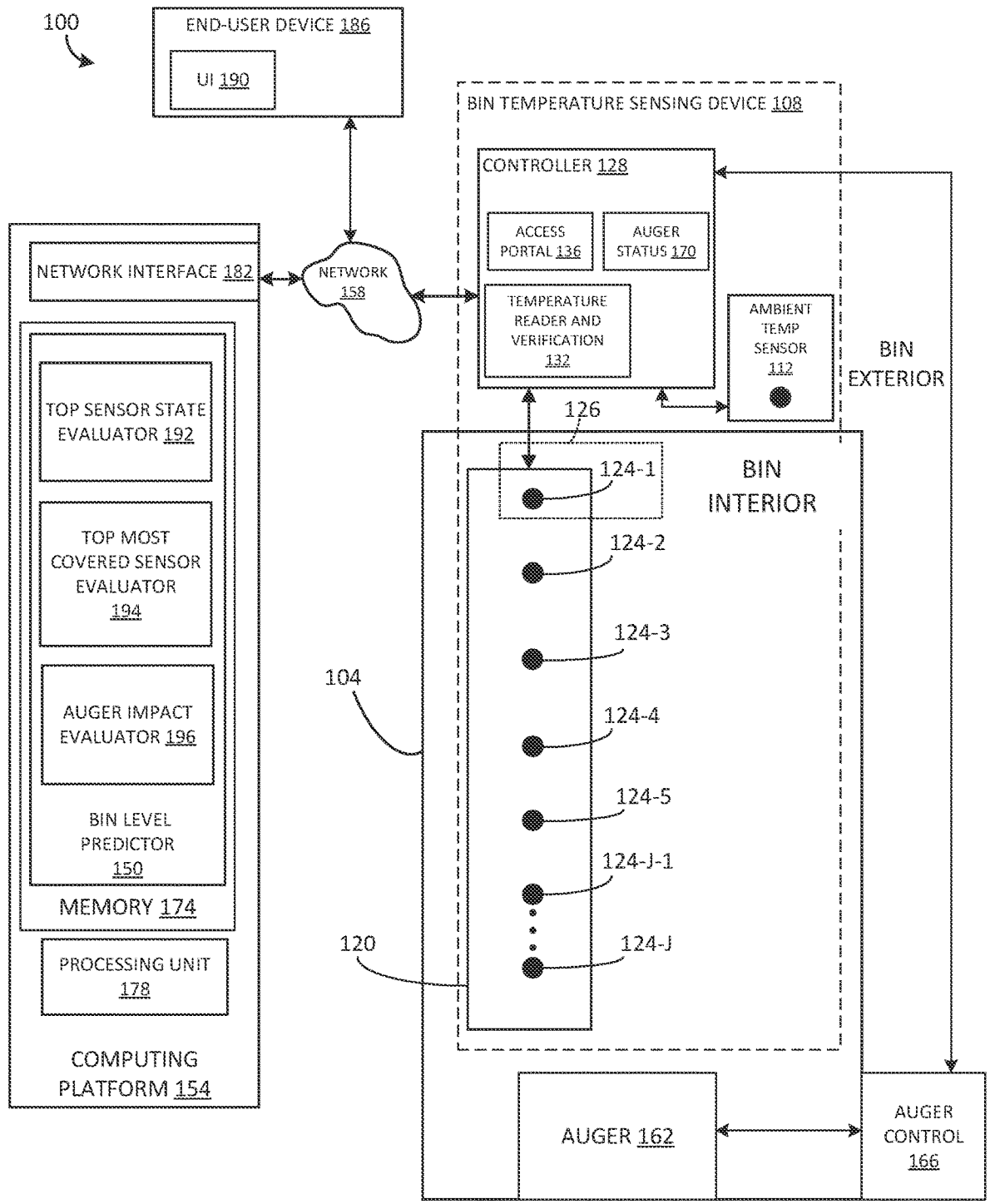
FIG. 1 illustrates an example of a system for predicting an amount of material in a storage bin.

Systems and methods are disclosed for calculating the amount of feed (or material, more generally) within a storage bin. Conventional methods for estimating the amount of feed in a storage bin are dangerous and error-prone tasks. Thus, the present disclosure describes a storage bin measurement system that can measure in real-time (e.g., within one minute) an amount of material (e.g., volume/weight/mass of material) in the storage bin.

The system includes a bin temperature sensing device that communicates with a bin volume predictor application (e.g., application software) executing on a computing platform. The bin temperature sensing device can include a temperature sensor cable. The temperature sensor cable of a set length includes a plurality of temperature sensors at prescribed locations of the set length of the temperature sensor cable. The temperature sensor cable can be designed to extend to the height of the storage bin. The bin temperature sensing device can also include an ambient temperature sensor that is configured to be positioned externally to the storage bin.

The bin volume predictor application includes a computing platform, such as a controller and/or a processing unit, a non-transitory memory and a network interface controller (NIC). The bin temperature sensing device is programmed to periodically and/or asynchronously record a temperature at each temperature sensor and to communicate each recorded temperature (or some subset thereof) with the computing platform executing the bin volume predictor application.

The bin volume predictor application executes a level prediction algorithm that analyzes each recorded temperature (or some subset thereof) within a given window of time (e.g., 1-24 hours). As described in detail herein, the level prediction algorithm predicts a topmost temperature sensor of the temperature sensor cable that is covered, wherein each temperature sensor below the topmost covered temperature sensor is also covered and each temperature sensor (if any) above the topmost covered temperature sensor is uncovered. As used herein, the term "uncovered" in relation to a particular temperature sensor indicates that a level of material (e.g., feed) within the storage bin is below the particular temperature sensor, such that the particular temperature sensor is exposed to air above the material. Similarly, the term "covered" in relation to a particular temperature sensor indicates that the level of material (e.g., feed) within the storage bin is at or above the particular temperature sensor, such that the particular temperature sensor is submerged in the material or partially submerged in the material.

Upon determining the topmost covered temperature sensor, the bin volume application can determine an amount of material (e.g., a volume, a weight and/or a mass) within the storage bin based on the topmost covered sensor. As one example, the determination can be made by employing a data structure, such as a look-up table that cross-references each temperature sensor on the temperature sensor cable with a volume, a weight and/or a mass of feed (or other material) within the storage bin for a corresponding window of time. In some examples, the bin volume predictor application can output the predicted amount of material on a display. In other examples, the bin volume predictor application can provide the predicted amount of material (e.g. feed) to an end-user device (e.g., a desktop computer or a mobile computing device) and the end-user device can output visual indicia (e.g., text and/or graphical information) characterizing the predicted amount of material at a user interface (UI).

Furthermore, in some examples, an auger with an auger motor can be activated to accelerate extraction of the material in the storage bin. In some examples, the bin volume predictor can identify a run time of the auger motor over the given window of time to calculate an amount of material extracted from the storage bin due to operation of the auger. The amount of material extracted from the storage bin due to operation of the auger can be employed to further tune the predicted volume of the amount of material in the storage bin and/or to monitor a health of the system.

FIG. 1 illustrates an example of a system 100 for determining a real-time (or within one minute) volume and/or weight of material stored in a storage bin 104. In the examples described herein, the material stored in the storage bin 104 is implemented as feed (e.g., animal fodder or forage). However, in other examples, the material can be inorganic material, such as a polymer employable for a three-dimensional (3D) printer.

In some examples, the storage bin 104 can have a circular cross-section, such that the storage bin 104 has a cylindrical shape. In other examples, the storage bin 104 can have a polygonal cross-section, such as a rectangular cross-section. The storage bin can be about 6 feet to about 12 feet (about 1.8 meters to about 3.6 m) in diameter and about 8 feet to about 40 feet (about 2.4 meters to about 12.2 meters) in height. In some examples, as explained herein a top region of the storage bin 104 and a bottom region of the storage bin 104 can each have a frustum shape.

A bin temperature sensing device 108 can include an ambient temperature sensor 112 that measures temperature of open air. The ambient temperature sensor 112 is situated on an exterior of the storage bin (referred to in FIG. 1 as "BIN EXTERIOR") and is exposed to the open air. The bin temperature sensing device 108 also includes a temperature sensor cable 120 that is configured to be situated in an interior of the bin (referred to in FIG. 1 as "BIN INTERIOR").

The temperature sensor cable 120 can have a set length. The set length can be selected based on the height of the storage bin. More particularly, the temperature sensor cable 120 has a set length that is 90% or more of the height of the storage bin 100. The temperature sensor cable 120 includes J number of temperature sensors 124 at prescribed locations along the set length of the temperature sensor cable 120, where J is an integer greater than one. The temperature sensor cable 120 can extend from or near the base of the storage bin 104 to a top region of the storage bin 104. The prescribed locations of the temperature sensor cable 120 can be selected based on the geometry of the storage bin 104. In some examples, there may be a temperature sensor 124 at each one foot (0.35 meters) interval along the length of the temperature sensor cable 120. In the present example, the first temperature sensor 124, labeled temperature sensor 124-1 is a top temperature sensor of the temperature sensor cable 120, and a last temperature sensor 124, labeled temperature sensor 124-J, is positioned as a bottom temperature sensor 124. In other examples, the numbering can be reversed.

For purposes of simplification of explanation, in the examples described herein, the term "top temperature sensor" (or top sensor) refers to the temperature sensor 124 of the temperature sensor cable 120 that is configured to be positioned nearest to a top of the interior of the storage bin 104, namely, temperature sensor 124-1 in the present example, and is also referenced as the top temperature sensor 126. Furthermore, "remaining temperature sensors" refer to each temperature sensor on the temperature sensor cable 120 other than the top temperature sensor 126 of the temperature sensor cable 120, namely temperature sensors 124-2 . . . 124-J. Each remaining temperature sensor 124 is configured to be positioned below the top temperature sensor 126, and each temperature sensor 124 (including the top temperature sensor 126) of the temperature sensor cable 120 is positioned in the interior of the storage bin 104 (labeled "BIN INTERIOR").

In some examples, the temperature sensor cable 120 can be tethered to a sidewall of the interior of the storage bin 104. In other examples, the temperature sensor cable 120 can be affixed to a fastener (e.g., an eyebolt) that is affixed to a bottom platform of the storage bin 104. In such a situation, the temperature sensor cable 120 can be spaced apart from the sidewall of the storage bin 104 and may be closer to a center of the storage bin 104. The temperature sensor cable 120 can be relatively rigid. In some examples, a metal cable or rod can extend along the length of the temperature sensor cable. In other examples, the temperature sensor cable can be formed with a relatively rigid polymer material.

The bin temperature sensing device 108 includes a controller 128, such as a processing unit with embedded instructions on a non-transitory memory and a NIC. That is, the controller 128 can be employed as a computing platform. The bin temperature sensing device 108 is programmed to periodically and/or asynchronously record a temperature at each temperature sensor 124 on the temperature sensor cable 120 and the ambient temperature sensor 112. More particularly, the controller 128 can include a temperature reader and verification module 132 (e.g., embedded software) that converts electrical signals into digital values that are stored in the memory of the controller 128. The temperature reader and verification module 132 can communicate with an access portal 136 operating on the controller 128. The access portal 136 enables the controller 128 to communicate with external entities. In particular, the access portal 136 can provide each recorded temperature (or some subset thereof) to a bin volume predictor 150 that is executing on a computing platform 154, such as a server over a network 158. The bin volume predictor 150 could alternatively be referred to as a bin material level predictor or bin material amount predictor. In some examples, the controller 128 can include a wireless NIC for communicating on the network 158. In some examples, the controller 128 can include some (or all) of the components of the computing platform 154, such as, but not limited to, the bin level predictor 150. The network 158 could be implemented for example, as a public network (e.g., the Internet), a private network (e.g., a carrier network) or a combination thereof.

Figure 2A:
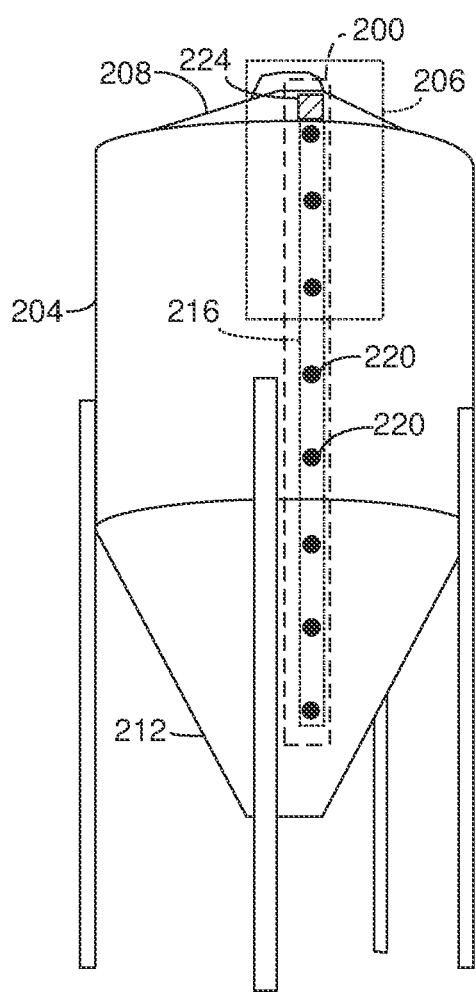
FIGS. 2A-2B illustrate views of an example of a bin temperature sensing device mounted on a storage bin.
Figure 2B:
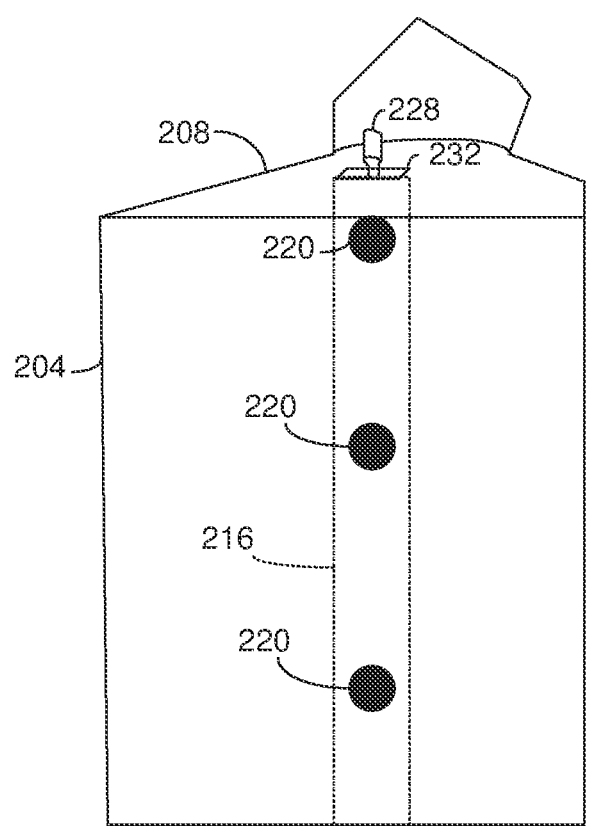

FIGS. 2A and 2B illustrate an example of a bin temperature sensing device 200 installed in a storage bin 204. FIG. 2A illustrates a front view of the storage bin 204 with the bin temperature sensing device 200 installed in an interior. For purposes of illustration, the storage bin 204 is illustrated as being transparent, such that portions of the bin temperature sensing device 200 are not hidden from view. FIG. 2B illustrates an zoomed-in region 206 of FIG. 2A. FIGS. 2A and 2B employ the same reference numbers to denote the same structure.

The bin temperature sensing device 200 can be employed to implement the bin temperature sensing device 108 of FIG. 1. The storage bin 204 can be employed to implement the storage bin 104 of FIG. 1. The storage bin 204 includes an upper frustum 208 and a lower frustum 212. The bin temperature sensing device 200 includes a temperature sensor cable 216 that extends from the upper frustum 208 of the storage bin 204 and into an interior of the lower frustum 212. The temperature sensor cable 216 can be employed to implement the temperature sensing cable 120 of FIG. 1. Thus, the temperature sensor cable 216 includes eight (8) temperature sensors 220 (only some of which are labeled). The bin temperature sensing device 200 also includes a controller 224 (not visible in FIG. 2B) that can be employed to implement the controller 128 of FIG. 1. The bin temperature sensing device 200 can further include an ambient temperature sensor 228 (not visible in FIG. 2A) that is employable to implement the ambient temperature sensor 112 of FIG. 1. The ambient temperature sensor 228 can extend from an opening 232 in the upper frustum 208 into the exterior of the storage bin 204. In this manner, the ambient temperature sensor 228 can measure and ambient temperature of the air around the storage bin 204.

The temperature sensor cable 216 hangs vertically from the opening 232. In some examples, the opening 232 is about 18 inches (about 45 centimeters) from an edge of the upper frustum 208. The position of the opening 232, which dictates the position of the temperature sensor cable 216, is selected based on an overall size of the storage bin 204.

Referring back to FIG. 1, in some examples, the storage bin 104 can include an auger 162 that can be actuated (activated/turned on) to accelerate removal of material within the interior of the storage bin 104. In such a situation, the system 100 can include an auger control 166 that can control a motor of the auger 162. In some examples, the auger control 166 can be controlled by the controller 128. Stated differently, the controller 128 can provide commands to activate or deactivate the auger 162. Additionally or alternatively, the auger control 166 can be controlled by an external system. The auger control 166 can provide data to the controller 128 characterizing an operational status of the auger 162. More particularly, the controller 128 can include an auger status module 170 that stores data characterizing the operational status of the auger 162 over a window of time (e.g., between about 1 hour to about 24 hours). In such a situation, the auger status module 170 includes data characterizing an amount of time the auger 162 was activated over the window of time. For instance, in one example, the auger status module 170 can store data (based on data provided from the auger control 166) indicating that the auger 162 has been run for 45 minutes in the past 24 hours. Alternatively, the auger status module 170 can record an on time (e.g., with a time stamp) and an off time (e.g., with another time stamp) for each time the auger 162 is activated and deactivated, respectively. Similar to temperatures recorded by the J number of temperature sensors 124, the data characterizing the operational status of the auger 162 over the window of time can be provided to the bin volume predictor 150 operating on the computing platform 154 through the access portal 136 of the controller 128.

The computing platform 154 includes a non-transitory memory 174 that stores the bin volume predictor 150 and/or other data. The memory 174 can be implemented as a non-transitory machine readable medium, such as random access memory (RAM), a solid state drive (SSD), flash memory, a hard disk drive (HDD) or a combination thereof. The computing platform 154 also includes a processing unit 178 (one or more processor cores) for accessing the memory and executing the machine executable instructions. The computing platform 154 can include a network interface 182 configured to communicate with the network 158. The network interface 182 could be implemented, for example, as a NIC.

The computing platform 154 can be employed as a server. Moreover, the computing platform 154 could be implemented in a computing cloud. In such a situation, features of the computing platform 154, such as the processing unit 178, the network interface 182, and the memory 174 could be representative of a single instance of hardware or multiple instances of hardware with applications executing across the multiple of instances (i.e., distributed) of hardware (e.g., computers, routers, memory, processors, or a combination thereof). Alternatively, the computing platform 154 could be implemented on a single dedicated server.

The bin volume predictor 150 can employ a level prediction algorithm to predict a topmost temperature sensor 124 of the temperature sensor cable 120 that is covered (referred to as a topmost covered temperature sensor 124), wherein each temperature sensor 124 below the topmost covered sensor is also covered for a given window of time (e.g., 1-24 hours). More particularly, the bin volume predictor 150 analyzes each recorded temperature (or some subset thereof) within the given window of time to identify time correlations between sensed temperatures to predict the topmost covered temperature sensor 124 along the temperature sensor cable 120, wherein each temperature sensor 124 below the topmost covered sensor is also covered with material (e.g., feed).

Additionally, in some examples, the level prediction algorithm can analyze data from the auger status module 170 to further tune the predicted amount of material in the storage bin 104. More particularly, upon identifying the topmost covered temperature sensor 124, the bin volume predictor 150 can determine a predicted amount of material in the storage bin 104. Moreover, the bin volume predictor 150 can employ the level prediction algorithm to adjust the predicted amount of material in the storage bin based on the data from the auger status module 170.

The bin volume predictor 150 can provide data back to the bin temperature sensing device 108 via the network 158. Additionally, in some examples, the bin volume predictor 150 can communicate with an end-user device 186 via the network 158. The end-user device 186 can be implemented as a computing device, such as a desktop computer, a notebook computer, a tablet, a smartphone, etc. The end-user device 186 can execute a user interface (UI) 190 that can be employed to interact with the bin volume predictor 150. In some examples, the UI 190 can be a graphical user interface (GUI) that can be employed with a dedicated client of the bin volume predictor 150. In other examples, the UI 190 can be representative of a web browser that accesses a web portal of the bin volume predictor 150. In still other examples, information related to the bin volume predictor 150 can be provided to the end-user device 186 in other formats, such as email alerts, short message services (SMS) message, etc. In such situation, the information related to the bin volume predictor is retrievable with the UI 190, which can be implemented with an email client.

FIG. 3 illustrates a list of variables 300 that are provided to the bin volume predictor 150 of FIG. 1. The list of variables 300 include bin configuration variables that are based on a typography of a temperature sensor cable (e.g., the temperature sensor cable 120 of FIG. 1) and a storage bin (e.g., the storage bin 104 of FIG. 1), such as a number of temperature sensors, the spacing of the temperature sensors, such as 12 inches (30.48 cm), 24 inches (60.96 cm), 36 inches (91.44 cm), the size of the storage bin, etc. The bin configuration variables also include a look-up table that correlates an amount (e.g., volume/weight/mass) of the material (feed) to a situation where the top temperature sensor of the temperature cable is covered (e.g., temperature sensor 124-1 in FIG. 1). Similarly, the bin configuration variables also include a look-up table that correlates an amount (e.g., volume/weight/mass) of the material to a situation where each remaining temperature sensor of the temperature sensor cable (e.g., temperature sensors 124-2 ... 124-J of FIG. 1) is the topmost covered sensor. The amount of the material can be reported in units such as kilograms, tons, pounds and/or rings (corresponding to rings employed to fabricate the storage bin).

The list of variables 300 also includes auger motor variables that characterize a state of an auger (e.g., the auger 162 of FIG. 1) over an interval of time. The auger motor variables includes a Boolean (yes/no or true false) condition indicating whether a sensor for the auger motor is enabled for the storage bin. The auger variables further include a number of tandem storage bins controlled by a common auger control (e.g., the auger control 166 of FIG. 1). The auger variables further include an amount of material per minute (or other unit of time) that is dispensed from the storage bin if the auger is running. This variable is configurable (e.g., based on user input). The auger variables further include a threshold defining a continuous on time exceeded duration of the auger, which is configurable. This continuous on time exceeded duration of the auger can be a trigger (or a factor in a trigger) for an error condition or a warning. Additionally, the auger variables include a threshold defining a continuous time off exceed duration, which is configurable. This continuous off time exceeded duration of the auger can be a trigger (or a factor in a trigger) for a warning.

The variables 300 also include sensor reading variables. The sensor reading variables can define a minimum number of temperature measurements (e.g., 4-10), a measurement time (e.g., 30 minutes to 90 minutes) and a time interval between measurements (e.g., 5-20 minutes).

The variables 300 can also include information characterizing values read from the bin temperature sensing device. Such values include an ambient temperature sensor reading from the ambient temperature sensor of the bin temperature sensing device and a sensor reading for each temperature sensor (or some subset thereof) of the temperature sensor cable. In this situation, there can be multiple values stored for each such temperature sensor reading. Additionally, by receiving both the ambient temperature sensor reading and the reading from each temperature sensor of the temperature sensor cable, the bin volume predictor application has information characterizing the temperature of the interior of the storage bin and the exterior of the storage bin. The values read can further include a motor on value (e.g., time stamp with a time of day) and a motor off value (e.g., a time stamp with a time of day) that represent times that the auger motor changes states from on to off, respectively. There can be multiple sensor readings for such variables. For instance, in situations where the auger motor is run twice in a particular window of time, there could be two motor on timestamps and two motor off time stamps.

Still further, the variables also include adjustable comparators that are based on a-priori knowledge of an environment in which the storage bin operates. For example, the adjustable comparators include an ambient temperature sensor stability variance constant that characterizes a stability of the ambient temperature sensor of the bin temperature sensing device. Furthermore, the adjustable comparators can include a top temperature sensor stability variance constant that characterizes a stability of the top temperature sensor of the temperature sensor cable. Additionally, the adjustable variables can include a remaining temperature sensor stability variance constant that characterizes a stability of the remaining temperature sensors of the temperature sensor cable.

Figure 4:
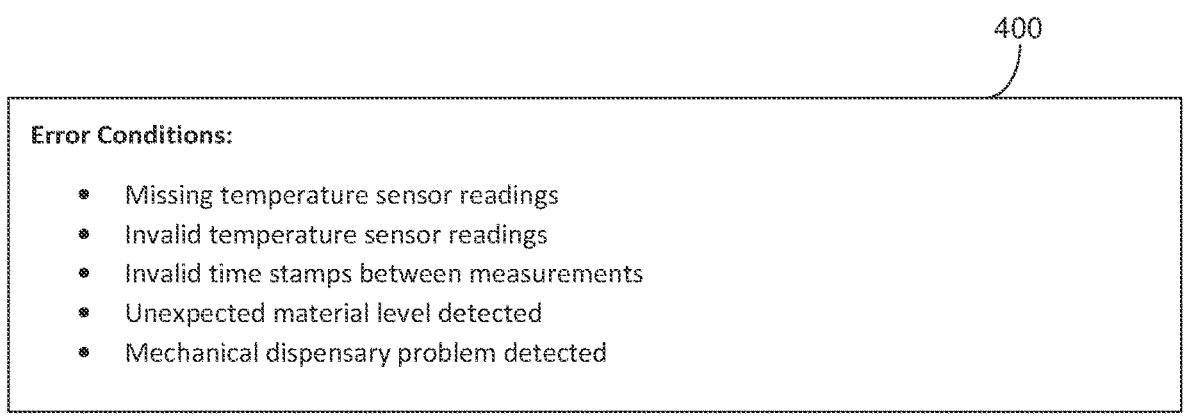
FIG. 4 illustrates a list of error conditions that can occur when predicting an amount of material in a storage bin.

FIG. 4 illustrates a list of possible error conditions 400 for the bin volume predictor application. The error conditions 400 include a missing temperature sensor reading, an invalid temperature sensor reading and/or invalid time stamps between measurements. The error conditions 400 also include an unexpected material level detected, which may indicate that there is a jam in a dispensing of material from the storage bin.

Referring back to FIG. 1, the level prediction algorithm executed by the bin volume predictor 150 is executed to determine the topmost covered sensor 124 of the temperature sensor cable 120. In some examples, the bin volume predictor 150 executes the level prediction algorithm in response (for example) to receiving a set of temperature values (corresponding to temperature measurements) and/or auger status data from the controller 128 of the bin temperature sensing device 108.

The bin volume predictor 150 reads the ambient temperature measured by the ambient temperature sensor 112 to determine an exterior temperature of the storage bin 104 and the temperature recorded by the J number of temperature sensors 124 of the temperature sensor cable 120 that characterize an interior temperature of the storage bin 104. In response to receiving temperature sensor data, the bin volume predictor 150 determines whether a minimum number of temperature measurements (defined in the sensor reading variables) has been received. If the bin volume predictor 150 does not receive the minimum number of temperature measurements, the bin volume predictor 150 can determine that an error condition exists. In such a situation, the bin volume predictor 150 can provide data characterizing the error condition to the UI 190 of the end-user device 186. In response, the UI 190 can output information indicating that an insufficient number of temperature readings are available to make an accurate prediction of a present volume of the storage bin 104. Additionally or alternatively, the error condition can be provided in an email alert that is addressed to a user to the end-user device 186 or an SMS alert message that is addressed to a phone number assigned to the end-user device 186. Such alerts are retrievable with the UI 190 operating on the end-user device 186.

Responsive to determining that a sufficient number of temperature readings are available to make an accurate bin volume prediction, a top sensor state evaluator 192 (e.g., a software module) of bin volume predictor 150 can execute a top sensor state algorithm (e.g., a sub-process) to determine if the top temperature sensor 126 is covered or uncovered.

To determine whether the top temperature sensor 126 is covered or uncover the top sensor state evaluator 192 calculates a variance of a plurality of temperature values (measurements) over a given window of time (e.g., 1-24 hours) measured by the ambient temperature sensor 112, wherein the plurality of temperature values is referred to as an ambient temperature sensor array. Additionally, the top sensor state evaluator 192 of the bin volume predictor 150 calculates a variance of a plurality of temperature values (measurements) over the given window of time from the top temperature sensor 126 of the temperature sensor cable 120, wherein the plurality of temperature values is referred to as a top temperature sensor array.

The top sensor state evaluator 192 of the bin volume predictor 150 can determine whether the variance of the top temperature sensor array is less than or equal to a top temperature sensor variance constant defined as the top interior temperature sensor constant of the variables 300 of FIG. 2. If the variance of the top temperature sensor array is greater than the top temperature sensor variance constant, the bin volume predictor marks the top temperature sensor 126 as being uncovered (exposed to air).

Conversely, if the variance of the top temperature sensor array is less than or equal to a top temperature sensor variance constant defined as the top interior temperature sensor constant, the top sensor state evaluator 192 of the bin volume predictor 150 makes another determination as to whether the variance in the ambient temperature array is greater than an ambient temperature sensor stability constant defined as the ambient temperature sensor stability variance in the variables 300 of FIG. 3. If the variance in the ambient temperature array is greater than an ambient temperature sensor stability constant, the top sensor state evaluator 192 marks the top temperature sensor 126 as being covered by material (e.g., feed). However, if the variance in the ambient temperature array is greater than the ambient temperature sensor stability constant, the top sensor state evaluator 192 records the top temperature sensor 126 as being uncovered (exposed to air).

By examining the variance of the top temperature sensor array and the variance of the ambient temperature array, the top sensor state evaluator 192 of the bin volume predictor 150 attempts to detect if this low variance is due to the top temperature sensor 126 being covered or is due to an exceedingly stable ambient temperature. If the variance of the ambient temperature sensor array is high (above the ambient temperature sensor stability variance constant), and the variance of the top temperature sensor array is low (below the top sensor variance constant), the top temperature sensor 126 is likely to be covered. Conversely, if both the variance of the ambient temperature sensor array and variance of the top temperature sensor array is high, the top temperature sensor 126 is likely to be uncovered. Furthermore, in a situation where the variance of the ambient temperature sensor array is low, the bin volume predictor 150 infers that the top temperature sensor 126 is likely to be uncovered (even if the variance of the top temperature sensor array is low).

Additionally or alternatively in some examples, the top sensor variance constant can be a threshold level of stability of values over the given window of time (corresponding to the minimum number of values in the sensor reading variables). The top sensor variance constant can correspond to an allowed covariance between the variance in the ambient temperature sensor array and the top temperature sensor array, which can be referred to as a covariance constant comparator. Some factors that can impact the covariance constant comparator are environmental conditions, such as a time of day (position of the sun), day of the year (angle of the sun), weather (raining, cloud coverage, sunny day, etc.).

Additional factors that can impact the covariance constant comparator include a location of the top temperature sensor 126 of the temperature cable 120 relative to an edge of the storage bin 104, a known feed temperature (newly added feed may have an elevated temperature), etc. Each such factor (or some subset thereof) can be employed to select the covariance constant comparator. Moreover, this list is not meant to be exhaustive. Other additional and/or alternative factors may be employed to select the covariance constant comparator that is employed to select the top sensor variance constant.

Conceptually, the comparison of the variance of the top temperature sensor array with the top sensor variance constant and the variance of the ambient temperature array with the ambient variance constant is employable to determine if there is a sufficiently close correlation between the temperatures measured by the top temperature sensor 126 of the temperature sensor cable 120 and the ambient temperature sensor 112 (the correlation corresponding to the top sensor variance constant selected based on the covariance constant comparator). If there is a sufficiently close correlation, it is likely that the top temperature sensor 126 is uncovered, which indicates that the temperatures measured at the top temperature sensor 126 "tracks" the temperatures measured by the ambient temperature sensor 112 over the given window of time. Conversely, if there is not a sufficiently close correlation, it is more likely that the top temperature sensor 126 of the temperature sensor cable 120 is covered in material (such as feed).

More particularly, by comparing the variance of the ambient temperature array with the ambient temperature sensor variance constant, the top sensor state evaluator 192 of the bin volume predictor 150 can determine whether the ambient temperature external to the storage bin 104 is too stable over the given time window to make an accurate prediction as to the state of the top temperature sensor 126 of the temperature sensor cable 120. Accordingly, in this situation, the top sensor state evaluator 192 makes a presumption that the top temperature sensor 126 is uncovered if the ambient temperature stays relatively constant over the given window of time, such that remaining temperature sensors 124-2 . . . 124-J below the top temperature sensor 126 of the temperature sensor cable 120 are evaluated (in a subsequent sub-process).

Continuing with a situation where the top temperature sensor 126 is covered, the bin volume predictor 150 can evaluate a data structure for the storage bin 104 to determine an amount of material (e.g., feed) present in the storage bin 104 when the top temperature sensor 126 is covered. Table 1 illustrates a sample data structure (e.g., a lookup table) that identifies an amount of feed corresponding to the number of temperature sensors 124 that are uncovered.

TABLE 1

| No. Covered Temperature Sensors | Weight of Feed (lbs) | Mass of Feed (kg) |
| --- | --- | --- |
| All | 27,500 | 12,474 |
| 6 | 23,500 | 10,659 |
| 5 | 18,250 | 8,278 |
| 4 | 13,250 | 6,010 |
| 3 | 8,250 | 3,742 |
| 2 | 3,750 | 1,701 |
| 1 | 1,000 | 454 |
| All Uncovered | 0 | 0 |

In Table 1, it is presumed that there are seven (7) temperature sensors 124 of the temperature sensor cable 120. Additionally, Table 1 is associated with a particular size of the storage bin 104. Additionally, it is presumed that the material in the storage bin 104 is a feed of a known volume/weight/mass. The data structure represented by Table 1 can be modified for different sizes of storage bins and/or different types of feeds. In such situations, there may be more or fewer temperature sensors 124 on the temperature sensor cable 120. Thus, by evaluating the data structure represented with Table 1, in an example where the top temperature sensor 126 is covered, the bin volume predictor 150 can determine that there is 27,500 lbs (12,474 kg) of feed in the storage bin 104.

Furthermore, in an example where the top temperature sensor 126 is uncovered, a topmost covered sensor evaluator 194 of the bin volume predictor 150 can execute a remaining sensor state algorithm (e.g., sub-process) to determine a topmost temperature sensor 124 (other than the top temperature sensor 126) of the temperature sensor cable 120 that is covered. Stated differently, the topmost covered sensor evaluator 194 executes the remaining sensor state algorithm in situations where the top temperature sensor 126 of the temperature sensor cable 120 has been marked as being uncovered. The remaining sensor state algorithm iteratively evaluates the remaining temperature sensors 124 of the temperature sensor cable 120 to determine a topmost remaining temperature sensor 124 that is covered during the given time window (e.g., 1-24 hours). In operation, the topmost covered sensor evaluator 194 individually evaluates temperature sensors 124 below the top temperature sensor 126 until either a (topmost) covered temperature sensor 124 is identified or it is determined that all J number of the temperature sensors 124 of the temperature sensor cable 120 are uncovered.

To execute the remaining sensor state algorithm the topmost covered sensor evaluator 194 initially marks every remaining temperature sensor 124 (temperature sensors 124-2 to 124-J) on the temperature sensor cable 120 as being uncovered. Additionally, the remaining sensor state algorithm executed by the topmost covered sensor evaluator 194 iteratively evaluates each remaining temperature sensor 124 marked as uncovered for being covered or uncovered until the topmost covered temperature sensor is identified or until each temperature sensor 124 has been evaluated. More specifically, if there is at least one remaining temperature sensor 124 with an undetermined state (covered or uncovered), the topmost covered sensor evaluator 194 selects a next temperature sensor 124 of the remaining temperature sensors 124 to be evaluated. As an example, during a first execution, the next temperature sensor 124 would be a second temperature sensor 124, namely temperature sensor 124-2 (e.g., the temperature sensor 124 immediately below the top temperature sensor 126 of the temperature sensor cable 120).

The topmost covered sensor evaluator 194 of the bin volume predictor 150 determines whether each value for the selected temperature sensor 124 during the given time window is greater than a predetermined number of degrees (e.g., 2 degrees Celsius) than the corresponding values for the top temperature sensor 126 of the temperature sensor cable 120. In this manner, the topmost covered sensor evaluator 194 determines whether all the values measured for the selected temperature sensor 124 exceed the corresponding values measured for the top temperature sensor 126 of the temperature sensor cable 120 by at least the predetermined number of degrees. It is likely that the selected temperature sensor 124 is covered in situations where every value of the selected temperature sensor 124 is greater than the corresponding value for the top temperature sensor 126 of the temperature sensor cable 120 by at least the predetermined number of degrees. Thus, if every value of the selected temperature sensor 124 is greater than the corresponding value for the top temperature sensor 126, the topmost covered sensor evaluator 194 marks the selected temperature sensor 124 as being covered.

Conversely, if there is at least one value of the selected temperature sensor 124 that is less than the top temperature sensor 126 of the temperature sensor cable 120 plus the predetermined number of degrees, the topmost covered sensor evaluator 194 of the bin volume predictor 150 calculates a variance for a plurality of values from temperature sensors 124 above the selected temperature sensor 124 for the given window of time as well as a covariance between a plurality of values for the selected temperature sensor 124 and a plurality of values from temperature sensors 124 above the selected temperature sensor 124. The plurality of values for the selected temperature sensor 124 can be referred to as a selected sensor array. Similarly, each set of the plurality of values for another temperature sensor 124 (above the selected temperature sensor 124) can be referred to as another sensor array. There can be at least the number of values in the selected sensor array and the other sensor array that are defined in the sensor reading variables of the variables 300 illustrated in FIG. 3.

Additionally, the topmost covered sensor evaluator 194 of the bin volume predictor 150 determines whether the covariance between the selected sensor array and another temperature sensor array associated with a temperature sensor 124 above the selected temperature sensor 124 is correlated with the variance in another temperature sensor array associated with a temperature sensor 124 above the selected temperature sensor 124 during the given time window. In this manner, the topmost covered sensor evaluator 194 determines whether the calculated covariance between the selected sensor array and an instance of another sensor array associated with a temperature sensor 124 above the selected temperature sensor 124 is greater than the calculated variance for an instance of another sensor array, which is associated with a temperature sensor 124 above the selected temperature sensor 124, multiplied by a temperature sensor variance constant (alternatively referred to as a variance multiplier) that can be defined in the adjustable comparators of the variables 300 illustrated in FIG. 3. If the calculated covariance is less than or equal to the calculated variance for an instance of another sensor array multiplied by the temperature sensor variance constant for all temperature sensors above the selected sensor, and at least one value of the selected sensor readings is more than "N" degrees C. away from the corresponding top sensor reading, and the selected temperature sensor 124 is determined to be the topmost covered temperature sensor 124.

Conversely, if the calculated covariance is greater than the calculated variance for an instance of another sensor array multiplied by the temperature sensor variance constant, the selected temperature sensor 124 remains marked as uncovered, and a next temperature sensor 124 is selected for evaluation as being covered or uncovered. The (next) selected temperature sensor 124 is immediately below the previously selected temperature sensor 124. Moreover, this process is repeated until a particular temperature sensor 124 is determined to be covered (indicating that each temperature sensor 124 below the particular temperature sensor 124 is also covered) or until the last temperature sensor 124, namely temperature sensor 124-J is determined to be uncovered.

Continuing with the example where the top temperature sensor 126 has been determined to be uncovered, and the topmost covered temperature sensor 124 has been identified, the bin volume predictor 150 can evaluate the data structure for the storage bin 104 to determine an amount of material (e.g., feed) present in the storage bin 104 corresponding to the identified topmost covered temperature sensor 124. For instance, the bin volume predictor 150 can evaluate Table/to determine an amount of feed (e.g., a particular type of material) in the storage bin 104 when any particular temperature sensor 124 is marked as being covered.

Responsive to determining the topmost covered sensor 124 (which may be the top temperature sensor 126 or any of the remaining temperature sensors 124-2 to 124-J), an auger impact evaluator 196 (e.g., a software module) of the bin volume predictor 150 can execute an auger motor impact estimation algorithm (e.g., sub-process). The auger motor impact estimation algorithm determines an amount of material (e.g., feed) that has been extracted from the storage bin 104 due to operation of the auger 162.

More particularly, the auger impact evaluator 196 can determine a run time for the auger 162 over the given window of time. The run time can be based on recorded motor on times and motor off times in the variables 300 of FIG. 3. In some examples, the auger control 166 can be connected to multiple storage bins, such as a situation where the storage bin 104 is one storage bin in a tandem of storage bins. In this situation, the variables 300 can include information identifying a number of storage bins running in tandem. Accordingly, in an example where the storage bin 104 is operating in tandem with another storage bin, the auger impact evaluator 196 can determine a percentage of the run time corresponding to the storage bin 104. Responsive to such calculations (the auger motor run time and the percentage of run time that corresponds to the storage bin 104), the auger impact evaluator 196 can calculate an amount of material extracted from the storage bin 104 due to operation of the auger 162 since a previous time that a prediction an amount of material in the storage bin 104 was made.

Accordingly, the bin volume predictor 150 can determine an auger compensated bin amount of material (e.g., feed) in the storage bin 104 based on a correlation between the amount of material extracted due to the operation of the auger 162 and the amount of material present in the storage bin 104 when the identified topmost temperature sensor 124 is covered. For instance, in a simplified example, the bin volume predictor 150 can subtract a predetermined percentage (e.g., 5%-100%) of the amount of material extracted due to the operation of the auger 162 from the amount of material present in the storage bin 104 when the identified topmost temperature sensor 124 is covered. In other examples, more complex mathematical operations can be included to determine the auger compensated amount of material (e.g., feed) in the storage bin 104. Additionally, in some examples, the auger compensated bin amount of material can be updated more frequently than the prediction of the amount of material in the storage bin 104.

If the auger compensated amount of material in the storage bin 104 is greater than an amount of material (e.g., feed) in the storage bin associated with uncovering a next lowest temperature sensor 124, the bin volume predictor 150 can provide the UI 190 of the end-user device 186, generate an email alert for a user of the end-user device 186 and/or an SMS alert message for a phone number assigned to the end-user device 186 with data characterizing an adjusted amount of material in the storage bin 104. The adjusted amount of material can be the same or a different (e.g., a percentage of) the auger compensated bin amount or the adjusted amount of material can be simply set to the predicted amount of material in the storage bin 104. In response, the UI 190 can output visual indicia (e.g., a number and/or a visual representation of the storage bin 104) that can be observed by a user of the end-user device 186 characterizing the adjusted compensated amount of material in the storage bin. In some examples, the visual indicia can also identify a type of the material (e.g., a type of feed) and a time that the adjusted amount of material in the storage bin 104 was last calculated.

If the auger compensated bin amount of material in the storage bin 104 is less than the amount of material (e.g., feed) in the storage bin 104 associated with a next lowest temperature sensor 124 being covered, the bin volume predictor 150 can trigger an auger error condition (or other types of error condition). As an explanation, consider the example where the top temperature sensor 126 is recorded as being covered, and the bin volume predictor 150 can determine that there is 27,500 lbs. (12,474 kg) of feed in the storage bin 104. Additionally, suppose that the auger impact evaluator 196 calculated an amount of material extracted due to operation of the auger 162 to be 5000 lbs. (2268 kg) of feed. In a simplified example of this situation, suppose that the auger compensated amount of feed (or material, more generally) would be 22,500 lbs. (10,206 kg) of feed. However, evaluation of Table 1 reveals that if there was in fact 22,500 lbs. (10,206 kg) of feed in the storage bin 104, that the top temperature sensor 126 would be uncovered, and that temperature sensors 124-2 (the second temperature sensor 124) would also be uncovered. Thus, in this situation, there may be a mechanical problem with the material dispensing operation of the storage bin 104, such that the auger error condition is triggered (set). For instance, the auger 162 may be misaligned, and material is not being extracted from the storage bin 104 at the expected rate.

If the auger error condition is triggered, the bin volume predictor 150 can provide information to the UI 190 characterizing a possible error and/or provide the information in an email alert addressed to a user of the end-user device and/or an SMS alert message address to a phone number assigned to the end-user device 186 characterizing a possible error. Additionally, in some examples, this information can identify the auger compensated bin amount of material (e.g., feed) in the storage bin 104. Furthermore, in some examples, the auger impact evaluator 196 can provide data to the auger status module 170 of the controller 128 characterizing the auger error condition. In response to the auger error condition, in some examples, the auger status module 170 can generate an auger inhibit signal that can be provided to the auger control 166. In response to the auger inhibit signal, the auger control 166 can disable the auger 162 (e.g., prevent the auger motor from running or stop a running auger motor) and generate a fault condition that needs to be manually cleared by an operation before operation of the auger 162 can be resumed, and clearing of the fault condition can cause the auger error condition to be cleared as well. That is, in some examples, the bin volume predictor 150 can operate in concert with the controller 128 to cause the auger 162 to be automatically disabled until the auger 162 and the storage bin 104 can be inspected, and the auger error condition can be cleared.

Furthermore, in some examples, the auger impact evaluator 196 can also monitor the health of the auger 162. More particularly, the auger impact evaluator 196 can examine the duration of time that the auger motor has been not running for a continuous off time exceeded duration (e.g., 24 hours) defined in the bin configuration variables of the variables 300 of FIG. 3. If values read related to the auger motor of the variables 300 of FIG. 3 indicate that the auger motor has not been activated over the continuous off time exceeded duration, the auger impact evaluator 196 can trigger an auger inspection alert (e.g., a warning), and data characterizing the auger inspection alert can be provided to the UI 190 of the end-user device 186. Additionally or alternatively, data characterizing the auger inspection alert can be provided in an email alert address to a user of the end-user device 186 and/or in an SMS alert message addressed to a phone number assigned to the end-user device 186. In response, the UI 190 can provide instructions to inspect the storage bin 104. For instance, such instructions can include checking to ensure that power to the auger 162 is online, inspecting livestock reliant on feed from the storage bin 104 (ensure that such livestock are eating), etc.

Similarly, if values read related to the auger motor of the variables 300 of FIG. 3 indicate that the auger motor for the auger 162 has been running continuously over a time interval that exceeds the continuous on time exceeded duration of the bin configuration variables of FIG. 3, the auger impact evaluator 196 can trigger a bin inspection alert, and data characterizing the bin inspection alert can be provided to the UI 190 of the end-user device 186. Additionally or alternatively, the data characterizing the bin inspection alert can be provided incorporated into an email alert and addressed to a user of the end-user device 186 and/or an SMS alert message address to a phone number assigned to the end-user device 186. In response, the UI 190 can provide corresponding instructions to inspect the storage bin 104. For instance, such instructions can include checking to see if the storage bin 104 is empty, checking to see if a chute (or other dispensing orifice) is sufficiently ajar, and inspecting a flow of material out of the storage bin 104. For instance, material exiting the storage bin 104 may not be traveling in an expected trajectory and/or electronic sensors controlling operations of the auger control 166 may be impaired. In this manner, in addition to predicting the volume of material present in the storage bin 104, the bin volume predictor 150 can be leverage to monitor the health of the auger 162 and associated infrastructure.

By employing the system 100, temperatures measured by the bin temperature sensing device 108 can be employed to determine a level of material in the storage bin 104. Moreover, using a-priori knowledge of the physical characteristics of the storage bin 104 (e.g., geometric dimensions) and known characteristics of the material in the storage bin (e.g., weight/mass by volume), the bin volume predictor 150 can predict a relatively accurate amount of material within the storage bin 104 at a given instance in time. Thus, the need for inaccurate "measurements" (e.g., banging one's hand or other appendage on a storage bin and listening to the resonation) or dangerous methods of direct observation (e.g., "walking the grain") that might induce grain entrapment can be avoided.

Figure 5:
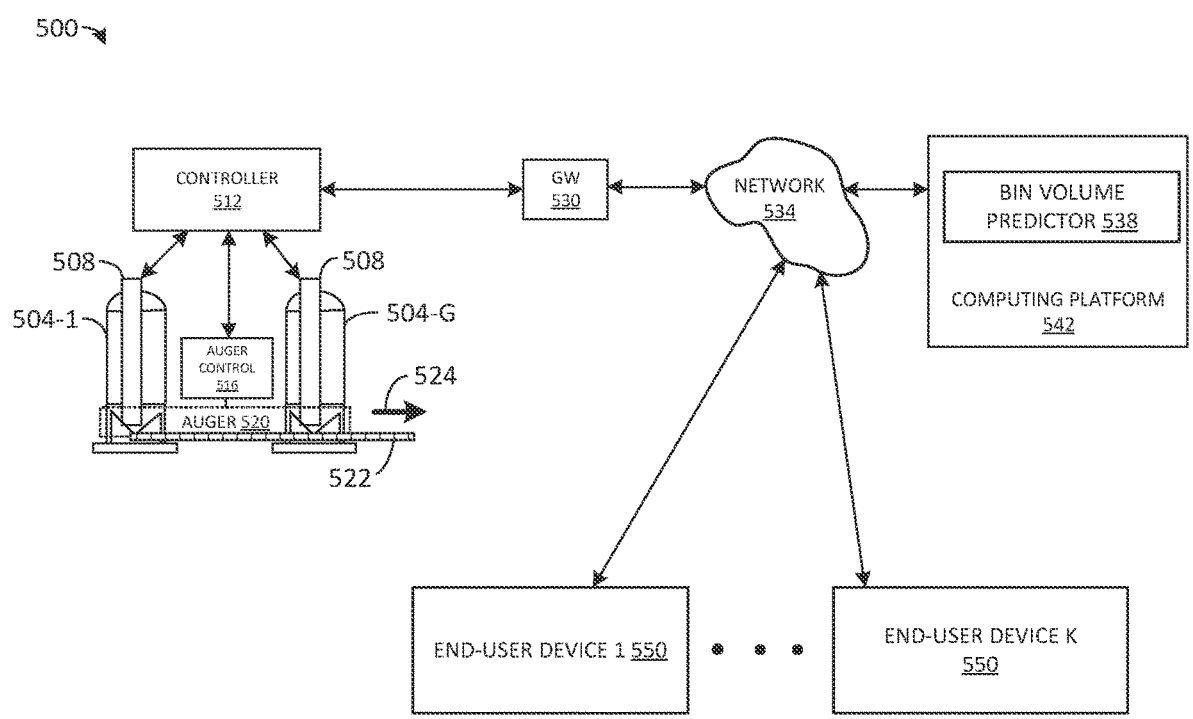
FIG. 5 illustrates an example of an enterprise-level system for predicting an amount of material in a set of storage bins.

FIG. 5 illustrates an enterprise-level system 500 that is employable to implement the system 100 of FIG. 1. More particularly, the system 500 is employable to predict a bin volume for G number of storage bins 504 (labeled as storage bin 504-1 . . . 504-G), where G is an integer greater than or equal to one. Each storage bin 504 can have a temperature sensor cable 508 that can be employed to implement the temperature sensing cable 120 of FIG. 1 hanging in an interior region. Each storage bin 504 can also have an ambient temperature sensor (not shown) for measuring an ambient temperature of a respective storage bin 504 that is employable to implement the ambient temperature sensor 112 of FIG. 1. Each temperature sensor cable 508 and each ambient temperature sensor can communicate with a controller 512 that is employable to implement the controller 128 of FIG. 1. A combination of a temperature sensor cable 508, an ambient temperature sensor and the controller 512 are employable to implement the bin temperature sensing device 108 of FIG. 1. In this manner, the same controller 512 is employable to communicate with multiple temperature sensor cables 508 and multiple ambient temperature sensors.

Additionally, in some examples, an auger control 516 can communicate with the controller 512. The auger control 516 can communicate with an auger 520 that is common to each of the storage bins 504. In this manner, each of the storage bins 504 are considered to be operating in tandem. In a situation where the storage bins 504 are operating in tandem, and the auger 520 is turned on, feed from a bottom of each storage bin 504 can be extracted and collected in a collection tube 522, wherein the material travels in a direction indicated by the arrow 524. More specifically, if each storage bin 504 is opened, the storage bin 504 that is furthest downstream (e.g., furthest away from a destination) on the collection tube 522 is emptied first. As an example, in the situation illustrated in FIG. 5, the first storage bin 504-1 would be the furthest downstream. Upon filling the collection tube 522 with material from the first collection bin 504-1, the region underlying the last storage bin 504-G (and any intervening storage bins 504) would already be full, such that little to no material would be extracted from upstream storage bins 504.

The controller 512 can receive temperature readings from each ambient temperature sensor and each temperature sensor cable 508 and relay this information to a gateway 530. The gateway 530 can be implemented as a network access point, such as a network access point for a network 534, such as a carrier network (e.g., a fourth generation (4G) network, a long term evolution (LTE) network, a fifth generation (5G) network, etc.) or a public network (e.g., the Internet).

The gateway 530 can relay the data collected from the controller 512 to a bin volume predictor 538 operating on a computing platform 542 through the network 534. The bin volume predictor 538 can be employed to implement the bin volume predictor 150 of FIG. 1, and the computing platform 542 can be employed to implement the computing platform 154 of FIG. 1. The bin volume predictor 538 can be employed to predict a volume of material in each of the G number of storage bins 504 in a manner described herein. Additionally, the bin volume predictor 538 can determine if an error condition related to the auger 520 is present in the manner described herein.

Data characterizing the calculated bin volume of material and/or error conditions can be provided to K number of end-user devices 550, where K is an integer greater than or equal to one. Additionally, in some examples, if an auger error condition is triggered, data characterizing the auger error condition can be returned to the controller 512. In response, in such examples, the controller 512 can generate an auger inhibit signal that can be provided to the auger control 516. In such a situation, the auger control 516 can disable the auger 520 (e.g., prevent the auger motor from running or stop a running auger motor) and generate a fault condition that needs to be manually cleared by an operation before operation of the auger 520 can be resumed, and clearing of the fault condition can cause the auger error condition to be cleared as well.

In view of the foregoing structural and functional features described above, an example method will be better appreciated with reference to FIGS. 6-9. While, for purposes of simplicity of explanation, the example methods of FIG. 6-9 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

Figure 6:
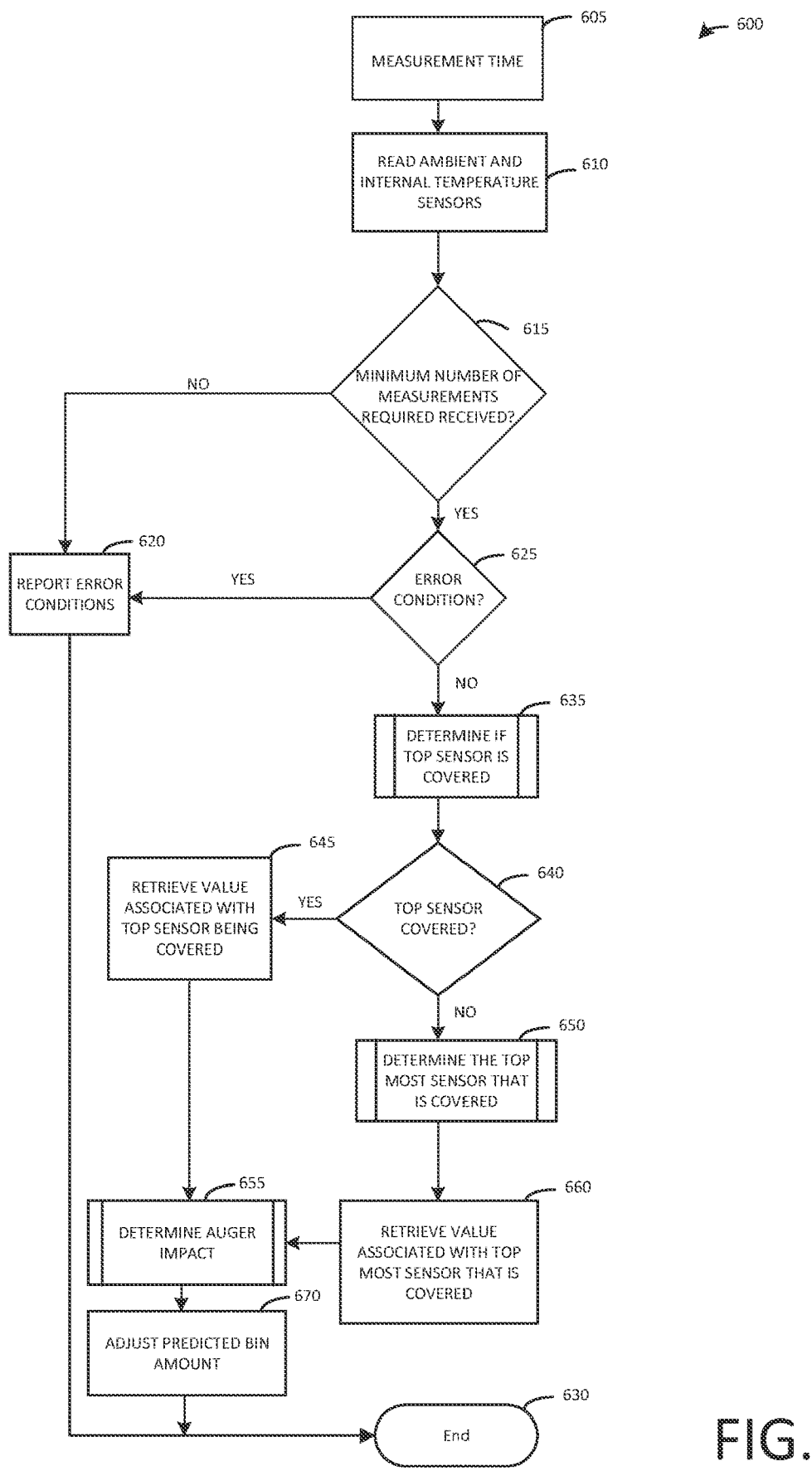
FIG. 6 illustrates a flowchart of an example method for predicting an amount of material in a storage bin.

FIG. 6 illustrates a flowchart of an example method 600 for predicting a volume of a storage bin. The method 600 can be executed by a bin volume predictor (e.g., the bin volume predictor 150 of FIG. 1). The method 600 can be employed to implement a level prediction algorithm. The method 600 includes several sub-methods explained in detail with respect to FIGS. 7-9. At 605 the method 600 initiated in response (for example) to receiving a set of temperature values (corresponding to temperature measurements at a specific time) from a bin temperature sensor device (e.g., the bin temperature sensing device 108 of FIG. 1).

At 610, the bin volume predictor reads an ambient temperature measured by an ambient temperature sensor (e.g., the ambient temperature sensor 112 of FIG. 1) to determine an exterior temperature of a storage bin (e.g., the storage bin 104 of FIG. 1) and a temperature measured by the temperature sensors (e.g., the J number of temperature sensors 124 of FIG. 1) of a temperature sensor cable (e.g., the temperature sensor cable 120 of FIG. 1) that characterizes an interior temperature of the storage bin. At 615, a determination is made by the bin volume predictor as to whether a minimum number of temperature measurements (defined in the sensor reading variables of FIG. 3) has been received. If the determination at 615 is negative (e.g., NO) the method 600 proceeds to 620. If the determination at 615 is positive (e.g., YES), the method 600 proceeds to 625. At 620, an error condition is reported. In some examples, the error condition can be reported to a UI (e.g., the UI 190 of FIG. 1) operating on an end-user device (e.g., the end-user device 186 of FIG. 1). Additionally or alternatively, the error condition can be included in an email alert addressed to a user of the end-user device and/or in an SMS message addressed to a phone number assigned to the end-user device. In such a situation, the UI can output visual indicia indicating that more temperature measurements are needed before an accurate bin volume can be predicted for the storage bin, and the method 600 can proceed to 630, where the method 600 ends.

At 625, the bin volume predictor makes a determination as to whether an error condition exists. If the determination at 625 is positive (e.g., YES), the method proceeds to 620. If the determination at 625 is negative (e.g., NO), the method proceeds to 635. At 635, the bin volume predictor executes a top sensor state algorithm to determine if a top temperature sensor (e.g., the top temperature sensor 126 of FIG. 1) of the temperature sensor cable is covered or uncovered. At 640, a determination is made by the bin volume predictor based on the results of the operations at 635. If the determination at 640 is positive (e.g., YES), the method 600 proceeds to 645. If the determination at 640 is negative (e.g., NO), the method 600 proceeds to 650.

At 645, the bin volume predictor can retrieve an amount of material (e.g., a volume, a weight and/or a mass) of material within the storage bin based on the top temperature sensor of the temperature sensor cable being covered (e.g., a maximum or near maximum volume/weight for the storage bin) from a data structure, such as a data structure corresponding to Table 1. As illustrated by Table 1, the determination can be made by employing a look-up table that cross-references the temperature for the top temperature sensor of the temperature sensor cable being covered with a volume, a weight and/or a mass of feed (or other material) within the storage bin for a corresponding window of time. Accordingly, this value can be set to a predicted bin volume for the storage bin and the method 600 can proceed to 655.

At 650, the bin volume predictor can execute a remaining sensor state algorithm to determine a topmost temperature sensor of the remaining temperature sensors (temperature sensors other than the top temperature sensor of the temperature sensor cable) that is covered. By execution of the remaining sensor state algorithm, the uncovered temperature sensor (if any) of the remaining temperature sensors is/are also revealed. At 660, the bin volume predictor can retrieve a volume/weight of feed within the storage bin based on the topmost covered sensor of the remaining temperature sensors as determined at 650 from the data structure (e.g., such as a data structure characterized by Table 1), and this value can be set to a predicted amount of material for the storage bin. Further, the method 600 can proceed to 655.

At 655, the bin volume predictor 150 can execute an auger motor impact estimation algorithm (e.g., sub-process). The auger motor impact estimation algorithm determines an amount of material (e.g., feed) that has been extracted from the storage bin 104 due to operation of the auger 162 since a previous time that an amount of feed in the storage bin was calculated. As noted, the actions 645 or at 660 can provide a predicted amount of material in the storage bin. Accordingly, at 670 the bin volume predictor 150 can determine an adjusted amount of material (e.g., feed) in the storage bin 104 based on a correlation between the amount of material extracted due to the operation of the auger and the amount of material present in the storage bin when the identified topmost temperature sensor is covered. The adjusted amount of material can be the same or different (e.g., a percentage of) an auger compensated amount of bin material. Moreover, in some examples, no adjustment to the predicted amount of material in the storage bin is needed, and the adjusted amount of material is equal to the predicted amount of material in the storage bin set at operations 645 or 660. Additionally, at 670, in some examples the bin volume predictor application can provide the adjusted amount of material to an end-user device (e.g., the end-user device 186 of FIG. 1) and the end-user device can output the predicted amount or the adjusted predicted amount (e.g., volume, weight and/or mass) through a UI.

Figure 7:
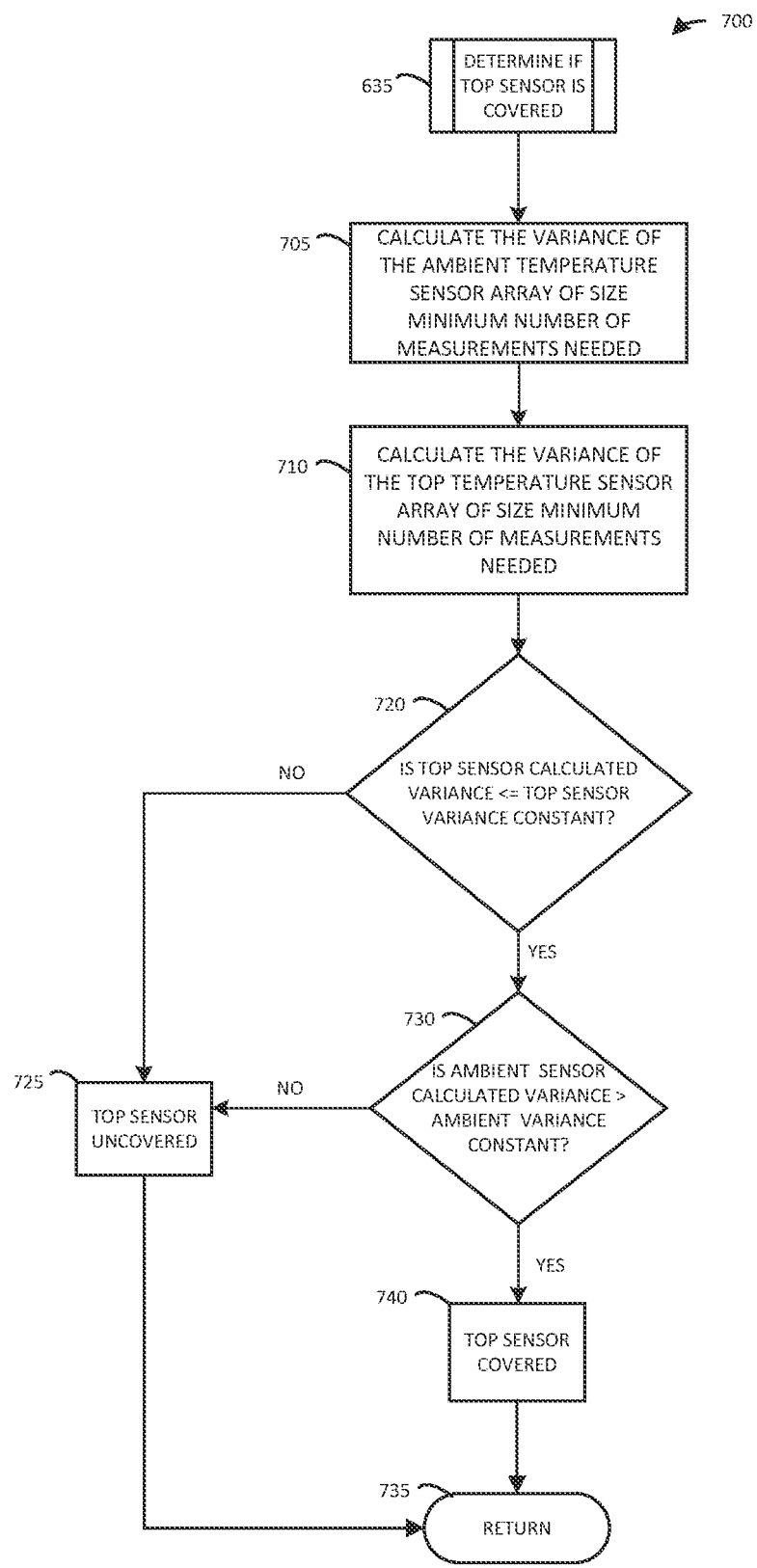
FIG. 7 illustrates a flowchart of an example sub-method for determining whether a top temperature sensor of a temperature sensing cable is covered with material.

FIG. 7 illustrates a sub-method 700 for executing the actions at 635 of FIG. 6. More particularly, the sub-method 700 executes a top sensor state algorithm to determine if the top sensor of the temperature sensor cable is covered or uncovered. The sub-method 700 can be executed, for example, by a bin volume predictor, such as the bin volume predictor 150 of FIG. 1.

At 705, the bin volume predictor calculates a variance of a plurality of temperature values (measurements) over a given window of time (e.g., 24 hours) from the ambient temperature sensor, wherein the plurality of temperature values is referred to as an ambient temperature sensor array. In the present example, it is presumed that the number of values in the ambient temperature sensor array meets or exceeds the minimum number of measurements recorded as defined in the sensor reading variables of FIG. 3.

At 710, the bin volume predictor calculates a variance of a plurality of temperature values (measurements) over a given window of time from the top temperature sensor of the temperature sensor cable, wherein the plurality of temperature values is referred to as a top temperature sensor array. In the present example, it is presumed that the number of values in the top temperature sensor array meets or exceeds the minimum number of measurements recorded as defined in the sensor reading variables of FIG. 3.

At 720, a determination is made by the bin volume predictor as to whether the variance of the top temperature sensor array is less than or equal to a top temperature sensor variance constant. If the determination at 720 is negative (e.g., NO), the sub-method 700 proceeds to 725. If the determination at 720 is positive (e.g., YES), the sub-method 700 proceeds to 730. At 725, the bin volume predictor determines that the top temperature sensor of the temperature sensor cable is uncovered (exposed to air) and the sub-method 700 proceeds to 735 and ends to return to the method 600 of FIG. 6.

At 730, the bin volume predictor makes a determination as to whether the variance in the ambient temperature array is greater than an ambient temperature sensor stability constant. If the determination at 730 is negative (e.g., NO), the sub-method 700 proceeds to 725. If the determination at 730 is positive (e.g., YES), the sub-method 700 proceeds to 740. At 740, the bin volume predictor marks the top temperature sensor as being covered by material (e.g., feed), and the sub-method 700 proceeds to 735, where the sub-method 700 ends and returns to the method 600 of FIG. 6.

The determinations made by the bin volume predictor at 720 and 730, taken in combination, ensures that in situations where the top sensor variance is low, the bin volume predictor executing the operations of the sub-method 700 attempts to detect if this low variance is due to the top sensor being covered or due to an exceedingly stable ambient temperature. For example, to execute the operations at 730, the bin volume predictor evaluates the variance of the ambient temperature sensor array. If the variance of the ambient temperature sensor array is high (above the ambient temperature sensor stability variance constant), and the variance of the top temperature sensor array is low (below the top temperature sensor variance constant), the top temperature sensor is likely to be covered. Conversely, if both the variance of the ambient temperature sensor array and variance of the top temperature sensor array are high, the top temperature sensor is likely to be uncovered. Furthermore, in a situation where the variance of the ambient temperature sensor array is low, the bin volume predictor infers that the top sensor is likely to be uncovered (even if the variance of the top temperature sensor array is low).

As additional or alternative operations in 720 and/or 730, the top sensor variance constant (e.g., defined in FIG. 3) can be a threshold level of stability of values over the given window of time (corresponding to the minimum number of values in the sensor reading variables). The top sensor variance constant can correspond to an allowed covariance between the variance in the ambient temperature sensor array and the top temperature sensor array, which can be referred to as a covariance constant comparator. Some factors that can impact the covariance constant comparator are environmental conditions, such as a time of day (position of the sun), day of the year (angle of the sun), weather (raining, cloud coverage, sunny day, etc.). Additional factors that can impact the covariance constant comparator include a location of the top temperature sensor of the temperature cable relative to an edge of the storage bin, a known feed temperature (newly added feed may have an elevated temperature), etc. Each such factor (or some subset thereof) can be employed to select the covariance constant comparator.

Moreover, this list is not meant to be exhaustive. Other additional and/or alternative factors may be employed to select the covariance constant comparator that is employed to select the top sensor variance constant.

Conceptually, the operations at 720 and 730 determine if there is a sufficiently close correlation between the temperatures measured by the top temperature sensor of the temperature sensor cable and the ambient temperature sensor (the correlation corresponding to the top sensor variance constant selected based on the covariance constant comparator). If there is a sufficiently close correlation, it is likely that the top temperature sensor is uncovered, which indicates that the temperatures measured at the top temperature sensor "tracks" the temperatures measured by the ambient temperature sensor over the given window of time. Conversely, if there is not a sufficiently close correlation, it is less likely that the top temperature sensor of the temperature sensor cable is covered in feed (or other material).

More particularly, the operations at 730 determine whether the ambient temperature external to the storage bin is too stable over the given time window to make an accurate prediction as to the state of the top temperature sensor of the temperature sensor cable. In effect, the operations at 730 make a presumption that the top temperature sensor is uncovered if the ambient temperature stays relatively constant over the given window of time, such that remaining temperature sensors below the top temperature sensor of the temperature sensor cable are evaluated (in a subsequent sub-process).

Figure 8:
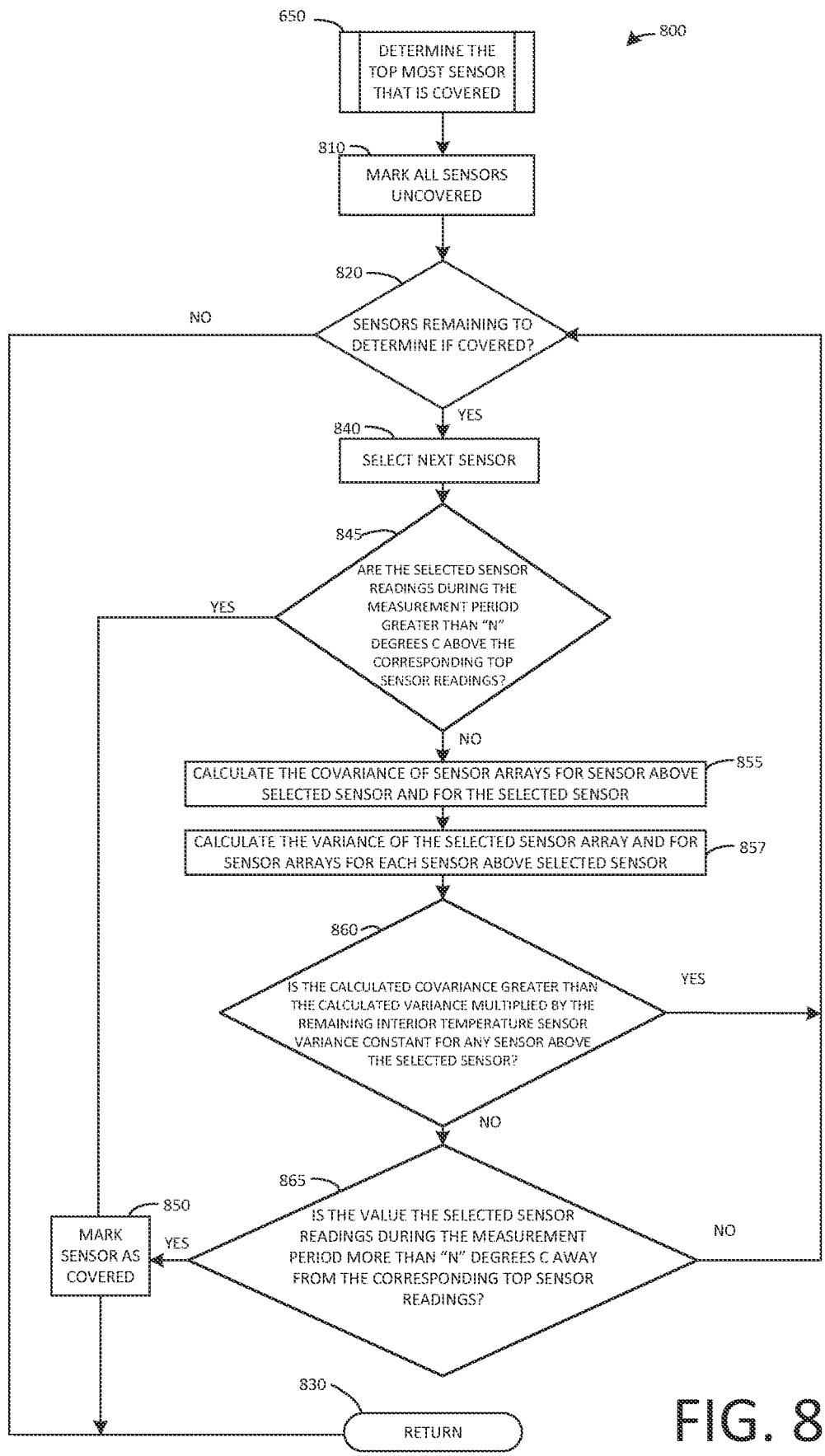
FIG. 8 illustrates a flowchart of an example sub-method for determining a topmost remaining temperature sensor of a temperature sensor cable that is uncovered.

FIG. 8 illustrates a sub-method 800 for executing the actions at 650 of FIG. 6. More particularly, the sub-method 800 executes a remaining sensor state algorithm to determine a topmost temperature sensor (other than the top temperature sensor) of the temperature sensor cable that is covered, which also reveals the temperature sensor(s) that is/are uncovered. Accordingly, the sub-method 800 is executed in situations where the top temperature sensor of the temperature sensor cable has been marked as being uncovered (e.g., in operation 725 of FIG. 7). The sub-method 800 evaluates the remaining temperature sensors of the temperature sensor cable to determine a topmost remaining temperature sensor that is uncovered during a given time window. The sub-method 800 executes iteratively, individually evaluating temperature sensors below the top temperature sensor until either a covered temperature sensor is identified or it is determined that all temperature sensors of the temperature sensor cable are uncovered.

At 810, the bin volume predictor marks every remaining temperature sensor on the temperature sensor cable as being uncovered. At 820, the bin volume predictor makes a determination as to whether there are any remaining temperature sensors of the temperature sensor cable for which a state (covered or uncovered) has not been determined. If the determination is negative (e.g., NO, indicating that every remaining temperature sensor has been determined to be uncovered), the sub-method 800 ends at 830 and returns to the method 600 of FIG. 6. If the determination at 820 is positive (e.g., YES, indicating that there is at least one more remaining temperature sensor to evaluate), the sub-method 800 proceeds to 840.

At 840, the bin volume predictor selects a next temperature sensor of the remaining temperature sensors to be evaluated. As an example, during a first execution, the next temperature sensor would be a second temperature sensor (e.g., the temperature sensor immediately below the top temperature sensor of the temperature sensor cable).

At 845, the bin volume predictor determines whether each value for the selected temperature sensor during the given time window is greater than a predetermined number of degrees (e.g., 2 degrees Celsius) than the corresponding values for the top temperature sensor of the temperature sensor cable. The operations at 845 determine whether all the values measured for the selected temperature sensor exceed the corresponding values measured for the top temperature sensor of the temperature sensor cable by at least the predetermined number of degrees. It is likely that the selected temperature sensor is covered in situations where every value of the selected temperature sensor is greater than the corresponding value for the top temperature sensor of the temperature sensor cable by at least the predetermined number of degrees.

If the determination at 845 is positive (e.g., YES), the sub-method 800 proceeds to 850. If the determination at 845 is negative (e.g., NO), the sub-method 800 proceeds to 855. At 850, the selected temperature sensor and each temperature sensor below the selected temperature sensor of the temperature sensor cable is marked as covered, and the sub-method 800 proceeds to 830.

At 855, the bin volume predictor calculates a covariance between a plurality of values for the selected temperature sensor and a plurality of values from temperature sensors above the selected temperature sensor for the given window of time. The plurality of values for the selected temperature sensor can be referred to as a selected sensor array. Similarly, each set of the plurality of values for another temperature sensor (above the selected temperature sensor) can be referred to as another sensor array. There can be at least the number of values in the selected sensor array and the other sensor array that are defined in the sensor reading variables of FIG. 3. At 857, the bin volume predictor calculates a variance for the selected sensor array (the plurality of values for the selected temperature sensor) and the variance of each sensory array associated with temperature sensors above the selected temperature sensor for the given window of time.

At 860, the bin volume predictor determines whether the covariance between the selected sensor array and another temperature sensor array associated with a temperature sensor above the selected temperature sensor is correlated with the variance of another temperature sensor array associated with a temperature sensor above the selected temperature sensor during the given time window. More particularly, the operations at 860 can determine whether the calculated covariance between the selected sensor array and an instance of another sensor array associated with a temperature sensor above the selected temperature sensor is greater than the calculated variance for an instance of another sensor array, which is associated with a temperature sensor above the selected temperature sensor, multiplied by a temperature sensor variance constant (alternatively referred to as a variance multiplier) that can be defined in the adjustable comparators of FIG. 3. If the determination at 860 is negative (e.g., NO), the sub-method 800 proceeds to 865. If the determination at 860 is positive (e.g., YES), the sub-method 800 returns to 820. Accordingly, through the operations at 860, the bin volume predictor keeps the selected temperature sensor as being marked as uncovered if the covariance between the selected sensor array and the sensor array that is associated with a temperature sensor above the selected temperature sensor is correlated with the variance of a sensor array that is associated with a temperature sensor above the selected temperature sensor during the given window of time.

At 865, the bin volume predictor determines whether one value (or multiple values) in the selected sensor array is more than the predetermined number of degrees different from the corresponding values for the top temperature sensor of the temperature sensor cable. The operations of 865 account for situations where there is a relatively low variance in the ambient temperature measured over the given window of time. If the determination at 865 is positive (e.g., YES), the sub-method 800 proceeds to 850. If the determination at 865 is negative (e.g., NO), the sub-method 800 returns to 820. Accordingly, through a combination of the operations at 860, 865 and 850, the selected temperature sensor and each temperature sensor below the selected temperature sensor is marked as covered if the covariance between the selected sensor array and a sensor array associated with a temperature sensor above the selected temperature sensor is not correlated with the variance of the same sensor array associated with a temperature sensor above the selected temperature sensor for any temperature sensor above the select temperature sensor during the window of time and one value (or more than one value) in the selected sensor array is more than the predetermined number of degrees different from the corresponding values of temperature measured by the top temperature sensor of the temperature sensor cable.

Figure 9:
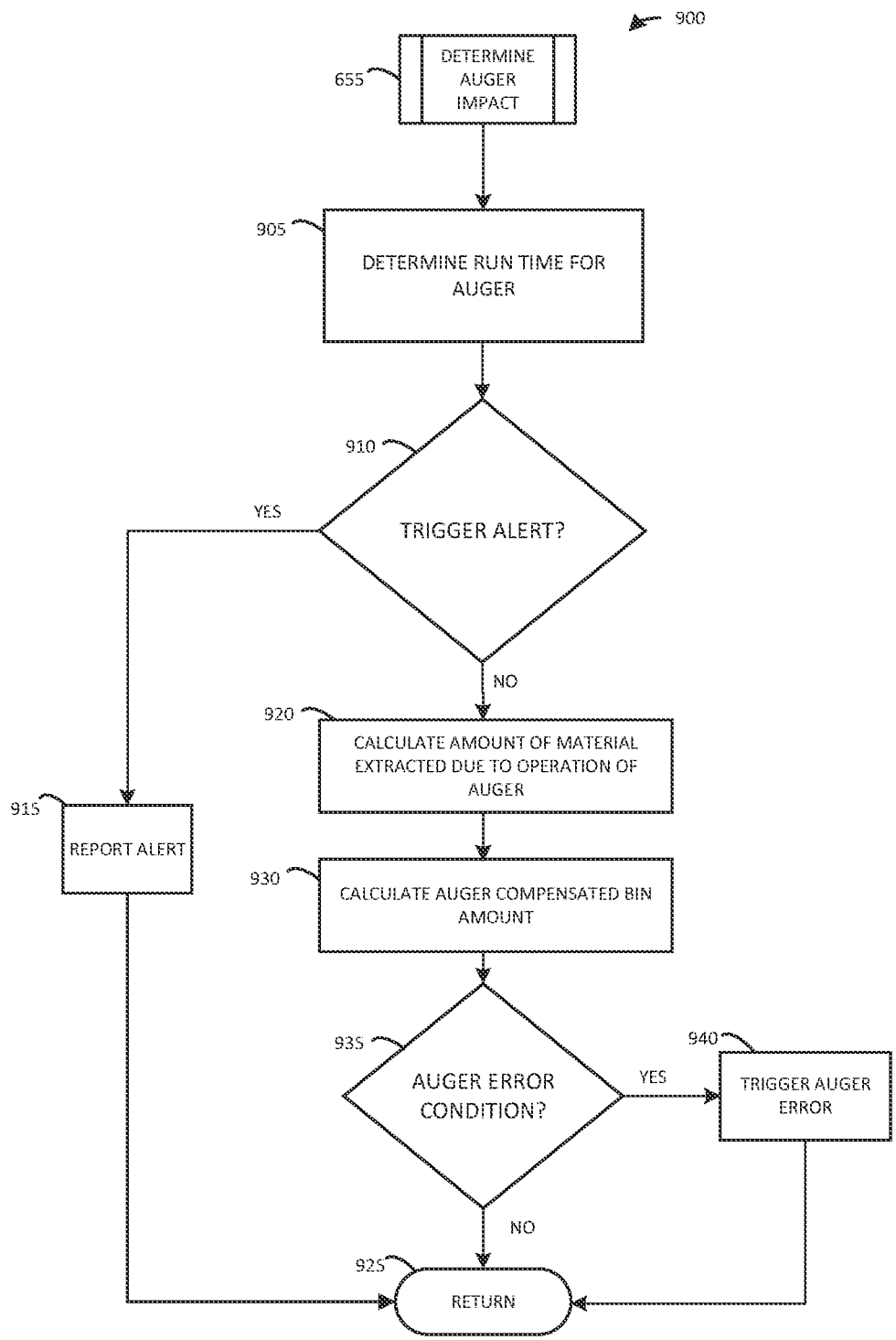
FIG. 9 illustrates a flowchart of an example method for calculating an impact of operating an auger at a storage bin.

FIG. 9 illustrates a sub-method 900 for executing the actions at 655 of FIG. 6. More particularly, the sub-method 900 executes an auger motor impact estimation algorithm (e.g., sub-process). The sub-method 900 can be executed by a bin volume predictor (e.g., the bin volume predictor 150 of FIG. 1). The auger motor impact estimation algorithm determines an amount of material (e.g., feed) that has been extracted from the storage bin due to operation of the auger since the last time the amount of material in the storage bin was calculated. In the sub-method 900, it is presumed that the bin volume predictor has determined an amount of material in the storage bin based on a topmost covered temperature sensor of a temperature sensor cable.

At 905, the bin volume predictor determines a run time for the auger over the given window of time based on data characterizing a status (e.g., on and off times) of the auger from the bin temperature sensing device over the given window of time (e.g., 24 hours). At 910, the bin volume predictor makes a determination as to whether to trigger an alert based on the determined run time for the auger. For example, if the run time for the auger is either above a continuous on time exceed duration (for the given window of time) or below a continuous off time exceed duration (both defined in FIG. 3), the bin volume predictor can trigger a corresponding auger inspection alert. If the determination at 910 is positive (e.g., YES), the sub-method 900 proceeds to 915. If the determination at 910 is negative (e.g., NO), the sub-method 900 proceeds to 920. At 915, data characterizing the auger trigger can be provided to the UI of the end-user device. Additionally or alternatively, the data characterizing the auger trigger can be included in an email alert addressed to a user of the end-user device and/or in an SMS alert messaged address to a phone number assigned to the end-user device. In any such example, information for inspecting and/or remedying a possible problem can be output at the end-user device. The sub-method 900 ends at 925 and returns to the method 600 of FIG. 6.

At 920, the bin volume predictor can calculate an amount of material extracted from the storage bin based on the run time of the auger over the given window of time. More particularly, the bin volume predictor can multiply the run time by a value that characterizes an amount of material per minute of run time defined in bin configuration variables of FIG. 3. In some examples, the auger can be connected to multiple storage bins, such as a situation where the storage bin is one storage a tandem of storage bins. In this situation, the variables 300 of FIG. 3 can include information identifying a number of storage bins running in tandem. Accordingly, in an example where the storage bin is operating in tandem with another storage bin, the bin volume predictor can determine a percentage of the run time corresponding to the storage bin. Responsive to such calculations (the auger run time and the percentage of run time that corresponds to the storage bin), the bin volume predictor can calculate an amount of material extracted due to operation of the auger since a pervious time that an amount of material in the storage bin was predicted.

At 930, the bin volume predictor can calculate an auger compensated bin amount based on the value representing the predicted amount of material in the storage bin and an amount of material extracted due to operation of the auger. In such a situation, a value representing the amount (e.g., volume/weight/mass) of material extracted due to operation of the auger (or some percentage thereof) subtracted from the predicted amount of material in the storage bin to determine an auger compensated bin amount. In other examples, other operations can be employed to calculate the auger compensated bin amount.

At 935, the bin volume predictor makes a determination as to whether a auger error condition exists. The determination at 935 can be based on a comparison of the auger compensated bin amount to a value associated with uncovering a next temperature sensor relative to the topmost covered temperature sensor of the temperature sensor cable. For instance, if the topmost temperature sensor is a third temperature sensor (e.g., temperature sensor 124-3 in FIG. 1), the next temperature sensor would be a fourth temperature sensor on the temperature sensor cable (e.g., the temperature sensor 124-4 of FIG. 1). If the auger compensated bin volume is less than the value (e.g., volume/weight/mass) associated with uncovering a next temperature sensor relative to the topmost covered temperature sensor of the temperature sensor cable (e.g., a value extracted from Table 1 or other data structure) the determination at 935 can be positive (e.g., YES), and the sub-method 900 proceeds to 940. If the auger compensated bin volume is greater than the value (e.g., a volume/weight/mass) associated with uncovering a next temperature sensor relative to the topmost covered temperature sensor of the temperature sensor cable (e.g., a value extracted from Table 1 or other data structure) the determination at 935 can be negative (e.g., NO), and the sub-method 900 proceeds to 925, where the sub-method 900 ends and returns to the method 600 of FIG. 6.

At 940, the bin volume predictor can trigger an auger error condition. In some examples, the bin volume predictor can provide data characterizing the auger error condition to the UI of the end-user device. Additionally or alternatively, data characterizing the auger error condition can be included in an email alert addressed to a user of the end-user device and/or in an SMS alert message addressed to a phone number assigned to the end-user device. In any such example, the UI can provide visual indicia of the auger error condition. Additionally or alternatively, in some examples, the bin volume predictor can provide a controller of the bin temperature sensing device with data characterizing the auger error condition. In response, in some examples, the controller can generate an auger inhibit signal that can be provided to the auger control that causes an auger fault (e.g., stops operation of the auger until the fault is cleared). The sub-method 900 ends at 925 and returns to the method 600 of FIG. 6.

Certain embodiments of the invention are disclosed herein with reference to illustrations of systems, and computer program products. It can be understood that blocks of the illustrations, and combinations of blocks in the illustrations, can be implemented by computer-executable instructions. These computer-executable instructions may be provided to one or more processors of a general purpose computer, a special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing cores) to function in a particular manner, such that the instructions stored in the computer-readable medium result in an article of manufacture including instructions which implement the function specified in the functional block or blocks illustrated in the figures. The computer program instructions may also be loaded onto a computer or other programmable data processing apparatus to cause a series of operational actions to be performed on the computer or other programmable apparatus to produce a computer implemented process such that the instructions which execute on the computer or other programmable apparatus provide actions for implementing the functions specified in the functional block or blocks or the associated description.

Where the disclosure or claims recite "a," "an," "a first," or "another" element, or the equivalent thereof, it should be interpreted to include one or more than one such element, neither requiring nor excluding two or more such elements. Furthermore, what are disclosed herein, are examples. It is, of course, not possible to describe every conceivable combination of components or methods, but one of ordinary skill in the art can recognize that many further combinations and permutations are possible. Accordingly, the disclosure is intended to embrace all such alterations, modifications, and variations that fall within the scope of this application, including the appended claims.

What is claimed is:

1. A non-transitory machine readable medium having machine executable instructions, the machine executable instructions comprising a bin volume predictor that:
   receives data characterizing measurements of a temperature at a plurality of temperature sensors of a temperature sensor cable that is positioned to extend along a height of the storage bin in an interior of the storage bin and data characterizing measurements of an ambient temperature of an exterior of the storage bin;
   identifies, based on the measured temperature for temperature sensors in the interior of the storage bin, whether a top temperature sensor of the temperature sensor cable is covered or uncovered, and if the top temperature sensor is uncovered, determining a topmost covered remaining temperature sensor of the temperature sensor cable,
   wherein the identifying whether the top temperature sensor of the temperature sensor cable is covered or uncovered further comprises:
      calculating a variance of an ambient temperature sensor array that includes a set of the measurements of the ambient temperature of the exterior of the storage over a window of time; and
      calculating a variance of a top temperature sensor array that includes a set of the measurements of the temperature measured by the top temperature sensor of the temperature sensor cable over the window of time; and
   determines, based on the identified topmost covered temperature sensor, an amount of material stored in the storage bin.

2. The medium of claim 1, wherein the bin volume predictor determines that the top temperature sensor is uncovered if the variance of the top temperature sensor array is less than a top temperature sensor variance constant or if the ambient temperature sensor array variance is greater than an ambient temperature sensor stability variance constant.

3. The medium of claim 2, wherein the bin volume predictor determines that the top temperature sensor is covered if the variance of the top temperature sensor array is less than the top temperature sensor variance constant and the ambient temperature sensor array variance is less than an ambient temperature sensor stability variance constant.

4. The medium of claim 1, wherein the bin volume predictor further:
   determines an amount of material extracted from the storage bin based on operation of an auger over a window of time;
   determines an auger compensated bin storage amount based on the amount of material extracted from the storage bin based on operation of the auger and on the determined amount of material stored in the storage bin; and
   triggers an auger error if the auger compensated bin storage amount is less than a storage amount associated with uncovering a temperature sensor below the topmost covered temperature sensor.

5. The medium of claim 1, wherein determining the topmost covered remaining temperature sensor of the temperature sensor cable comprises:
   marking each temperature sensor of the remaining temperature sensors as uncovered; and
   iteratively evaluating each temperature sensor of the remaining temperature sensors marked as being uncovered for being covered or uncovered until the topmost covered temperature sensor of the remaining temperature sensors is identified or until each temperature sensor of the remaining temperature sensors has been evaluated.

6. The medium of claim 5, wherein the iterative evaluating comprises:
   selecting a temperature sensor of the remaining temperature sensors that is marked as uncovered; and
   marking the selected temperature sensor and each temperature sensor below the selected temperature sensor as covered if each temperature measured by the selected temperature sensor is greater than a predetermined number of degrees above corresponding values of temperature measured by the top temperature sensor of the temperature sensor cable.

7. The medium of claim 6, wherein the iterative evaluating further comprises:
   calculating a covariance between a selected sensor array for the selected temperature sensor and each sensor array in a set of sensor arrays, wherein each sensor array in the set of sensor arrays includes a plurality of values measured by corresponding temperature sensors above the selected temperature sensor for a window of time and the selected sensor array includes a plurality of values measured by the selected temperature sensor for the window of time;

calculating a variance for each sensor array in the set of sensor arrays; and keeping the selected temperature sensor as being marked as uncovered if the covariance between the selected sensor array and another sensor array in the set of sensor arrays associated with a temperature sensor above the selected temperature sensor is correlated with the variance of a sensor array in the set of sensor arrays.

8. The medium of claim 7, wherein the selected temperature sensor and each temperature sensor below the selected temperature sensor is marked as covered if the covariance between the selected sensor array and another sensor array in the set of sensor arrays is not correlated with the variance of a sensor array in the set of sensor arrays and a value in the selected sensor array is more than the predetermined number of degrees different from the corresponding values of temperature measured by the top temperature sensor of the temperature sensor cable.

9. The medium of claim 1, wherein the bin volume predictor further:

determines an amount of material extracted from the storage bin based on operation of an auger over a window of time; and adjusts the determined amount of material based on the determined amount of material extracted from the storage bin.

10. The medium of claim 1, wherein the determining of the amount of material extracted from the storage bin based on operation of an auger further comprises:

determining a run time of a motor for the auger over the window of time; and determining a percentage of the run time that corresponds to extracting material from the storage bin.

11. The medium of claim 4, wherein triggering of the auger error causes an auger fault that prevents activation of the auger until the auger fault is cleared.

12. A system comprising:

a non-transitory memory having machine executable instructions;

a processing unit for accessing the memory and executing the machine executable instructions, the machine executable instructions comprising a bin volume predictor that:

receives data characterizing measurements of a temperature at a plurality of temperature sensors of a temperature sensor cable that is positioned to extend along a height of the storage bin in an interior of the storage bin and data characterizing measurements of an ambient temperature of an exterior of the storage bin, wherein the bin volume predictor further:

determines an amount of material extracted from the storage bin based on operation of an auger over a window of time;

determines an auger compensated bin storage amount based on the amount of material extracted from the storage bin based on operation of the auger and on the determined amount of material stored in the storage bin; and triggers an auger error if the auger compensated bin storage amount is less than a storage amount associated with uncovering a temperature sensor below the topmost covered temperature sensor;

identifies, based on the measured temperature of temperature sensors in the interior of the storage bin, a topmost covered temperature sensor of the temperature sensor cable;

determines, based on the identified topmost covered temperature sensor an amount of material stored in the storage bin;

provides data to a user interface UI that outputs visual indicia characterizing the amount of material stored in the storage bin.

13. The system of claim 12, wherein the amount of material characterizes at least one of a volume, a weight and a mass of the material in the storage bin.

14. The system of claim 12, wherein the material in the storage bin is feed for livestock, and the storage bin is a silo.

15. The system of claim 12, wherein the identifying comprises:

determining whether a top temperature sensor of the temperature sensor cable is covered or uncovered, and if the top temperature sensor is uncovered, determining a topmost covered remaining temperature sensor of the temperature sensor cable.

16. The system of claim 15, wherein determining the topmost covered remaining temperature sensor of the temperature sensor cable further comprises:

marking each temperature sensor of the remaining temperature sensors as being uncovered; and iteratively evaluating each temperature sensor of the remaining temperature sensors marked as being uncovered for being covered or uncovered until the topmost covered temperature sensor of the remaining temperature sensors is identified or until each temperature sensor of the remaining temperature sensors has been evaluated.

17. A method for determining an amount of material in a storage bin, the method comprising:

receiving, at a bin predictor executing on a computing platform, data characterizing measurements of a temperature at a plurality of temperature sensors of a temperature sensor cable that is positioned to extend along a height of the storage bin in an interior of the storage bin and data characterizing measurements of an ambient temperature of an exterior of the storage bin;

identifying, by the bin volume predictor, whether a top temperature sensor of the temperature sensor cable is covered or uncovered, based on the measured temperature for temperature sensors in the interior of the storage bin, and if the top temperature sensor is uncovered, determining a topmost covered remaining temperature sensor of the temperature sensor cable;

wherein the identifying of whether the top temperature sensor of the temperature sensor cable is covered or uncovered further comprises:

calculating a variance of an ambient temperature sensor array that includes a set of the measurements of the ambient temperature of the exterior of the storage over a window of time; and calculating a variance of a top temperature sensor array that includes a set of the measurements of the temperature measured by the top temperature sensor of the temperature sensor cable over the window of time; and determining, by the bin volume predictor, based on the identified topmost covered temperature sensor an amount of material stored in the storage bin.

* * * * *